United States Patent
Malik et al.

(10) Patent No.: US 7,629,424 B2
(45) Date of Patent: Dec. 8, 2009

(54) METAL-CONTAINING COMPOSITIONS AND METHOD OF MAKING SAME

(75) Inventors: Mangala Malik, Attleboro, MA (US); Joseph J Schwab, Huntington Beach, CA (US)

(73) Assignee: Pryog, LLC, Providence, RI (US)

( * ) Notice: Subject to any disclaimer, the term of this patent is extended or adjusted under 35 U.S.C. 154(b) by 185 days.

(21) Appl. No.: 11/792,739

(22) PCT Filed: Jun. 12, 2006

(86) PCT No.: PCT/US2006/022885

§ 371 (c)(1),
(2), (4) Date: Jun. 12, 2007

(87) PCT Pub. No.: WO2007/070092

PCT Pub. Date: Jun. 21, 2007

(65) Prior Publication Data

US 2008/0015278 A1    Jan. 17, 2008

(30) Foreign Application Priority Data

Dec. 9, 2005    (WO) ............... PCT/US2005/044670

(51) Int. Cl.
*C08F 30/04* (2006.01)
(52) U.S. Cl. ...................... 526/240; 526/241
(58) Field of Classification Search ........................ None
See application file for complete search history.

(56) References Cited

U.S. PATENT DOCUMENTS

| | | | | |
|---|---|---|---|---|
| 2,502,411 A * | 4/1950 | Neher et al. | ................ | 526/241 |
| 3,264,272 A | 8/1966 | Rees | ........................ | 260/78.5 |
| 3,672,942 A | 6/1972 | Neumann et al. | .......... | 117/62.2 |
| 4,429,094 A | 1/1984 | Massucco | ................... | 526/240 |
| 4,585,841 A | 4/1986 | Eguchi et al. | ............... | 526/240 |
| 4,608,409 A | 8/1986 | Coady et al. | ................ | 524/199 |
| 5,064,877 A | 11/1991 | Nass et al. | ................... | 522/172 |
| 5,484,867 A | 1/1996 | Lichtenhan et al. | ............ | 528/9 |
| 5,664,041 A | 9/1997 | Szum | ........................ | 385/128 |
| 5,856,415 A | 1/1999 | Lagace et al. | ................ | 526/192 |
| 6,194,504 B1 | 2/2001 | Nagel et al. | ................. | 524/394 |
| 6,291,070 B1 | 9/2001 | Arpac et al. | ................ | 428/412 |
| 6,432,526 B1 | 8/2002 | Arney et al. | ................ | 428/328 |
| 6,553,169 B2 | 4/2003 | Fabian | ........................ | 385/128 |
| 6,656,990 B2 | 12/2003 | Shustack et al. | ............ | 524/430 |
| 6,844,950 B2 | 1/2005 | Ja Chisholm et al. | ......... | 359/49 |
| 6,846,572 B2 | 1/2005 | Yamaguchi et al. | ......... | 428/524 |
| 2002/0082323 A1 | 6/2002 | Chawla et al. | ............. | 524/203 |
| 2004/0171743 A1 | 9/2004 | Flaim et al. | ................ | 524/577 |
| 2005/0131175 A1* | 6/2005 | Weck et al. | ................ | 526/171 |

OTHER PUBLICATIONS

E. Bryan Coughlin, "Silsesquioxane based Inorganic Organic Hybrid Copolymers".
"Brewer Science Offers Novel High Refractive Index Polymers"—www.brewerscience.com.
Yubao Wang et al, "Hybrid high refractive index polymer coatings".
Henry W. Oviatt, "Polyhedral Oligomeric SilSesquioxane (POSS) Fillers as Refractive Index Enhancers for Silicone Intraocular Lenses", 18-9333.
D. Skrtic et al, "Dental composites based on hybrid and surface-modified amorphous calcium phosphates", Biomaterials 25 (2004), pp. 1141-1150.
D. Skrtic et al, "Volumetric contraction and methacrylate conversion in photo-polymerized amorphous calcium phosphate/methacrylate composites", Biomaterials 24 (2003), pp. 2443-2449.
International Search Report for International Application No. PCT/US05/44670 dated Jun. 26, 2006.
International Search Report for International Application No. PCT/US06/22885 dated Feb. 12, 2008.

* cited by examiner

*Primary Examiner*—David Wu
*Assistant Examiner*—Vu Nguyen
(74) *Attorney, Agent, or Firm*—Alix, Yale & Ristas, LLP

(57) ABSTRACT

The present invention relates to metal-containing compositions with refractive indices of at least 1.5 comprising a metal-containing precursor unit (MU), a prepolymer unit (PU), and a catalyst or an initiator capable of inducing a combining reaction of ethylenically unsaturated functional groups of the metal-containing precursor unit and reactive functional groups of the prepolymer unit. In another embodiment, the composition comprises MU and a catalyst or initiator capable of inducing a combining reaction of the metal-containing precursor units. Both MU and PU contain additional functional groups, which may be selected to impart compatibility with each other and to produce optically clear films. The metal-containing compositions can be used to produce films or articles having a transmittance of at least 90% and index of refraction in the range of 1.5 to 1.8 in the 400-700 nm range of light and 1.5 to 2.4 in the 150-400 nm range of light.

27 Claims, No Drawings

METAL-CONTAINING COMPOSITIONS AND METHOD OF MAKING SAME

RELATED APPLICATIONS

This application is the national phase of international application no. PCT/US05/22885 filed Jun. 12, 2006, which claims priority based upon international application PCT/US05/044670 filed Dec. 9, 2005, which in turn claims priority based upon U.S. Provisional Patent Application No. 60/634,890 filed Dec. 13, 2004.

FIELD OF THE INVENTION

This invention relates to metal-containing compositions useful in manufacturing films and other articles with enhanced refractive index, optical clarity, thermal properties, chemical resistance, scratch resistance, adhesion and surface hardness. Such films and articles find applications in the area of light management films, articles and devices.

BACKGROUND TO THE INVENTION

Polymeric films and articles are extensively used in optical applications. One major problem with the use of such materials is reflective losses at the substrate/air interface, resulting in lower intensity of transmitted light. Issues of reflective losses across multiple interfaces can be addressed by adjusting the refractive indices of the films. One such example is cured film of urethane acrylate resin, which is widely used as protective coat in variety of applications involving display devices. Although, urethane protective coats have excellent transparency, hardness and scratch resistance, it is difficult to modify their refractive indices due to limited choices of building materials that are available for optical applications. An alternative means of modifying refractive index is to use small amounts of miscible additives, which do not alter other fundamental properties such as transparency, hardness and scratch resistance.

High refractive index values of metal compounds make them ideal candidates as additives to boost refractive indices of organic polymeric materials. For instance, Arpac et al. in U.S. Pat. No. 6,291,070 describe use of several nanoscale inorganic particles to create molded articles of varying refractive indices. Practical utility of inorganic particles in boosting refractive index is greatly restricted by the limited compatibility between such particles and organic polymeric matrices. Processes such as "micronization" can produce nanoparticles with relatively high dispersion to some extent but there is a practical limit to the size achievable economically by "micronization". For applications where transparency is important, the particle size must be smaller than the wavelength of the light in order for the material to be transparent. Sol-gel or solution-colloidal phase reactions are alternative means of generating very fine particles of metal oxides, but the nature of the small particles often leads to their agglomeration, causing increased hazing and scattering of a transparent article over time.

Issues of agglomeration of fine particles can be addressed through chemical surface reactions. For instance, inorganic particles, described by Arpac et al. in U.S. Pat. No. 6,291,070, were surface-treated with hydrolysable silane containing at least one polymerizable and/or polycondensable group. Chisholm et al. in U.S. Pat. No. 6,844,950 also describe the use of nanoparticles of ethylenically unsaturated compounds of zirconium and titanium. Similarly, Arney et al. in U.S. Pat. No. 6,432,526 describes the use of metal oxides modified with dispersing aids for improved compatibilization with organic materials. The main difficulty with this approach is that the actual nanoparticle compositions are changed by attaching these modifying species to them. Moreover, the metal concentration in any subsequent formulations is decreased by the presence of these organic functional groups. Most critically, the issues of hazing and light scattering after the article has been exposed to prolonged storage are not completely solved due to the limited shelf life of surface modified metal particles. Designing metal-containing compositions with homogeneous dispersion in the final article or the polymerizable fluid and long shelf life stability, therefore, continues to be a challenge.

Use of discrete metal compounds as processing aids and curing agents in the processing of certain types of elastomers and some dental compositions is known. For instance, Nagel et al in U.S. Pat. No. 6,194,504 describe the use of metal salts of acrylic acid as processing aids to improve dispersion of such curing additives in butadiene, natural rubber and EPDM based elastomers. Fabian in U.S. Pat. No. 6,553,169 and Shustack et al. in U.S. Pat. No. 6,656,990 describes the use of less than 0.5 weight-percent of titanates and zirconates as energy curable coupling agents to improve adhesive properties and dispersion of pigments. Similarly, use of zirconium-based acrylate as coupling agent between amorphous calcium phosphate and polymeric matrices has been reported by Skrtic et al. [Biomaterials 24 (2003) 2443-2449].

None of the art reported above teaches how to create an optically clear film or article with excellent physical and mechanical properties, especially ones with high refractive index, and improved shelf life from compositions containing discrete metal-containing functional precursor units.

SUMMARY OF THE INVENTION

An objective of this invention is to provide novel metal-containing compositions with refractive indices of at least 1.5. They are produced by combining discrete metal-containing functional precursor units. A further objective of this invention is to provide processes for combining these compositions reactively so as to produce films or articles. The metal-containing compositions of this invention are especially useful to produce films or articles with excellent optical clarity and shelf life stability.

In one embodiment this invention provides a composition formed by combining compounds comprising a metal-containing precursor unit (MU), a prepolymer unit (PU), and a catalyst or an initiator capable of inducing combining reactions of ethylenically unsaturated functional groups of MU and reactive functional groups of PU. The compositions are optically clear as measured by the Transmittance Test. The compositions are useful in enhancing refractive index and yield films, composites, and other articles with excellent thermal properties, chemical resistance, scratch resistance, adhesion, and surface hardness.

MU contains at least one ethylenically unsaturated functional group capable of undergoing combining reactions and at least one ligand with refractive index of at least 1.5. MU is represented by Structure I:

Structure I where M comprises at least one metal with formal valency of 0-5 selected from the group consisting of Zr, Hf, Ge, Ti, Sn, Zn, Ni, Nb, Eu, In, Al, Mn, Nd, Sb, Mg, and Y. The A, B, and C groups may be selected to impart compatibility with a variety of prepolymers and organic solvents, improve curing efficiency and to form an optically clear film or article as determined by the Transparency Test.

Ligand A is selected individually or in combination from organic compounds with refractive index of at least 1.5 (as calculated by ACD Labs ChemSketch 8.0 software, index of refraction calculation module); w is 1 to 5. Ligand B contains an ethylenically unsaturated functional group capable of undergoing combining reactions; x is 0 to 4, with the proviso that x can be 0 only when A contains an ethylenically unsaturated functional group capable of undergoing a combining reaction. Ligand C is selected from oxygen, sulfur, a halogen atom, or —$XR^1$ where X is oxygen or sulfur and $R^1$ represents an unsubstituted or substituted alkyl group, an unsubstituted or substituted alkyl ether group, a group containing a halogen atom, or a substituted or unsubstituted aryl group; y is 0 to 4. The sum of w, x, and y equals 1 to 5.

Compounds forming Ligand A usually are selected individually or in combination from substituted or unsubstituted naphthalene, phenyl, alicyclic, heterocyclic or cyclic olefinic compounds. Specific examples of Ligand A forming compound are 6-(2-naphthylthio)bicyclo[2.2.1]heptane-2-carboxylic acid, bromobenzoic acid, adamantane-1,3-dicarboxylic acid, and 3-({(2S)-2-[(2R)-3,4-dihydroxy-5-oxo-2,5-dihydrofuran-2-yl]-2-hydroxyethoxy}carbonyl)bicyclo[2.2.1]hept-5-ene-2-carboxylic acid.

Ligand B contains an ethylenically unsaturated functional group capable of undergoing a combining reaction in the presence of a suitable initiator or catalyst typically employed in formulating these compositions. The most common example of Ligand B is an acryloyl group or a (meth)acryloyl group. Other examples of B are compounds containing vinyl, allyl, stryl, or a cyclic olefinic group, which are capable of undergoing a combining reaction with other reactive functional groups such as ethylenically unsaturated functional groups, a —SiH group or a —SH group of other MU and/or PU.

Ligand C is selected from oxygen, sulfur, a halogen atom, or —$XR^1$ where X is oxygen or sulfur and $R^1$ represents an unsubstituted or substituted alkyl group, an unsubstituted or substituted alkyl ether group, a group containing a halogen atom, or a substituted or unsubstituted aryl group; y is 0 to 4. The sum of w, x, and y equals 1 to 5.

Examples of MU include zirconium 6-(2-naphthylthio)bicyclo[2.2.1]heptane-2-carboxylate triacrylate, where according to Structure I M is Zr, A is 6-(2-naphthylthio)bicycle[2.2.1]heptane-2-carboxylate, B is acrylate, w=1, x=3, y=0, and w+x+y=4; hafnium [(1S,4R)-7,7-dimethyl-2-oxobicyclo[2.2.1]hept-1-yl]methanesulfonate triacrylate, in which case M is Hf, A is [(1S,4R)-7,7-dimethyl-2-oxobicyclo[2.2.1]hept-1-yl]methanesulfonate, B is acrylate, w=1, x=3, y=0, and w+x+y=4; zirconium bicyclo[2.2.1]hept-5-ene-2-carboxylate, in which case M is Zr, A is bicyclo[2.2.1]hept-5-ene-2-carboxylate, w=4, x=0, y=0, and w+x+y=4; and zirconium 6-(2-naphthylthio)bicyclo[2.2.1]heptane-2-carboxylate 2-naphthalenethiolate diacrylate, in which case M is Zr, A is 6-(2-naphthylthio)bicyclo[2.2.1]heptane-2-carboxylate, B is acrylate, C is 2-naphthalenethiolate, w=1, x=2, y=1, and w+x+y=4.

The term prepolymer unit (PU) refers to a monomer unit or an oligomer, where oligomer refers to a combination of monomer units joined together. The prepolymer may contain many monomeric units and is capable of further reactions to be incorporated in the final material. The PU contains terminal and/or pendant reactive functional groups, which can participate in combining reactions, with metal-containing precursor units (MU). Examples of such terminal and pendant reactive functional groups are a vinyl group, an allyl group, a (meth)acryloyl group, a —SiH group and a —SH group. The monomer units of the PU may be selected to be compatible with MU and to form an optically clear film or article. The average molecular weight of the PU is between 70 and $10^7$ Daltons. An example of PU can be diurethane dimethacrylate supplied by Aldrich Chemical Company (Catalog No. 436909).

Another embodiment is a composition comprising MU, PU and a catalyst or an initiator capable of inducing combining reactions of ethylenically unsaturated functional groups of the MU and reactive functional groups of the PU, wherein the composition, after reaction, is optically clear as measured by the Transmittance Test. An important criterion in the selection of the MU and the PU for the metal containing composition of this invention is that they are compatible with each other, that is, they are capable of undergoing a combining reaction with each other and the composition forms an optically clear film or article as measured by the Transmittance Test.

The catalyst or initiator used in the composition is a compound capable of catalyzing combining reactions of the MU and the PU, usually in the presence of added light or heat. An example of photoinitiator is 1-hydroxy-cyclohexyl-phenyl-ketone, (Irgacure 184) from Ciba Specialty Chemicals.

The composition may further include a non-aqueous solvent and/or an additive. The composition may further comprise a co-monomer with only one ethylenically unsaturated functional group.

In another embodiment, this invention provides compositions comprising metal-containing precursor unit (MU) and a catalyst or an initiator capable of inducing combining reactions of ethylenically unsaturated functional groups of MU units to form an optically clear film or article. MU can be used alone or in combination with the proviso that at least a portion of MU contains at least two ethylenically unsaturated functional groups.

Another embodiment is a composition comprising MU and further comprising a metal (meth)acrylate, where the metal of the metal (meth)acrylate has a formal valency of at least 4. Specific examples of the metal (meth)acrylate are zirconium, hafnium, germanium, niobium and titanium (meth)acrylate. An important criterion in the selection of the MU, PU (if included), and metal (meth)acrylate is that they are compatible with each other, that is, they are capable of undergoing combining reactions with each other and the composition forms an optically clear film or article as measured by the Transmittance Test.

The present invention also includes a method of forming a composition comprising preparing a mixture comprising a metal containing precursor unit (MU), a prepolymer unit (PU), and a catalyst/initiator under conditions sufficient to induce a combining reaction of an ethylenically unsaturated functional group of MU and a reactive functional group of PU. Another embodiment is a method of forming a composition comprising preparing a mixture comprising MU and a catalyst or initiator under conditions sufficient to induce a combining reaction of ethylenically unsaturated functional groups of MU units. A further embodiment is a method of making an article comprising preparing a mixture comprising MU, PU and a catalyst or initiator under conditions sufficient to induce a combining reaction of ethylenically unsaturated functional groups of MU and reactive functional groups of PU. Another embodiment is a method of making an article comprising preparing a mixture comprising MU and a catalyst or initiator under conditions sufficient to induce a combining reaction of ethylenically unsaturated groups of MU units.

The formulations of this invention are stable i.e. they do not show any sign of separation for at least 2 months upon storage at room temperature (23° C.). In contrast compositions containing metal oxides as fine particles are not stable.

The invention also provides a method of using the composition to form an optically clear film or article. The film can be part of a laminate.

The invention further includes a coated, a laminated, or a molded article formed by the composition. The composition and the film, or the laminate or the molded article formed therefrom usually has an index of refraction in the range of 1.5 to 1.8 in the 400-700 nm range of light and 1.5 to 2.4 in the 150-400 nm range of light. The cured film typically has at least 90% retention of optical clarity. In many cases, the composition has a transmittance of at least 95% as measured by the Transmittance Test.

Further scope of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

Definitions of Terms Used:

The term "reactive functional group" as used herein refers to functional groups such as a —SiH group, a —SH group and ethylenically unsaturated groups such as a vinyl group, an allyl group, a (meth)acryloyl group. The term "combining reaction" as used herein refers to polymerization and/or crosslinking reactions of reactive functional groups. Combining reactions include reactions of ethylenically unsaturated functional groups among themselves and reactions involving ethylenically unsaturated groups with a —SiH group or a —SH group. The crosslinking is usually chemical crosslinking but in some cases can be physical crosslinking. Combining reactions can take place with MU and MU, MU and PU, and PU and PU (the latter two cases can only occur when PU is present in the composition). The term "ligand" as used herein refers to molecules, ions or atoms attached to the central atom of a coordination compound, a chelate or other complex.

The term "cured" as used herein refers to a composition, film or article that has been crosslinked. A "fully cured" composition, film or article does not show any solubility in acetone as determined by mechanically rubbing a cotton swab soaked in acetone. As used herein, a "partially cured" composition, film or article shows some solubility in acetone as determined by mechanically rubbing a cotton swab soaked in acetone.

As used herein, the term "optically clear" refers to a composition, which would have greater than 90% transmittance of light in the 400-700 nm range if it were formed into a film having a thickness of 4-6 μm. Many of the compositions disclosed herein have a transmittance of at least 95%. In a number of cases, the transmittance is at least 99%.

In the Transmittance Test, the composition is coated onto a Luminor T PET film from Toray (75 μm thick) with a wire-wound coater (3 mil diameter), Catalog No. AR-4103 from BYK Gardner, to a wet film thickness of 4-6 μm and the transmittance is measured by a UV/Vis spectrophotometer in the 400-700 nm range. Transmittance can be measured before or after curing. Usually, transmittance measurements taken before and after curing are substantially the same.

The term "retention of optical clarity" refers to a cured film or article having at least 90% of its original % transmittance as measured by the Transmittance Test after two months of storage at 23° C. with relative humidity 50-65% under ambient conditions of light.

In one embodiment, this invention provides compositions comprising a metal-containing precursor unit (MU), a prepolymer unit (PU), and a catalyst or initiator capable of inducing combining reactions of ethylenically unsaturated functional groups of MU and reactive functional groups of PU to form an optically clear film or article. Another embodiment is a composition formed by combining compounds comprising a metal-containing precursor unit (MU), a prepolymer unit (PU), and a catalyst or initiator capable of inducing combining reactions of ethylenically unsaturated groups of MU and PU. An important criterion in the selection of the MU and the PU for the metal containing composition of this invention is that they are compatible with each other as determined by the fact that the composition forms an optically clear film or article before curing. The metal-containing compositions are also useful in enhancing refractive index. Films and articles formed by the compositions have excellent optical and thermal properties, chemical resistance, scratch resistance, and surface hardness.

MU contains at least one ethylenically unsaturated group capable of undergoing a combining reaction and at least one ligand with refractive index of at least 1.5. MU is represented by Structure I:

$$MA_wB_xC_y \qquad \text{Structure I}$$

where M comprises a metal with formal valency of 0-5 such as Zr, Hf, Ge, Ti, Sn, Zn, Ni, Nb, Eu, In, Al, Mn, Nd, Sb, Mg, and Y. The A, B, and C groups may be selected to impart compatibility with a variety of prepolymers and organic solvents, improve curing efficiency and to form an optically clear film or article as determined by the Transparency Test.

Ligand A is selected individually or in combination from organic compounds with a refractive index of at least 1.5 (as calculated by ACD Labs ChemSketch 8.0 software, index of refraction calculation module); w is 1 to 5. Ligand B contains an ethylenically unsaturated group capable of undergoing combining reactions; x is 0 to 4, with the proviso that x can be 0 only when A contains an ethylenically unsaturated group capable of undergoing combining reactions. Ligand C is selected from oxygen, sulfur, a halogen atom, or —XR$^1$ where X is oxygen or sulfur and R$^1$ represents an unsubstituted or substituted alkyl group, an unsubstituted or substituted alkyl ether group, a group containing a halogen atom, or a substituted or unsubstituted aryl group; y is 0 to 4. The sum of w, x, and y must equal 1 to 5.

Compounds forming Ligand A can be selected individually or in combination from substituted or unsubstituted naphthalene, phenyl, alicyclic, heterocyclic or cyclic olefinic compounds.

Specific examples of Ligand A forming compounds are 4-hydroxy-8-(2-naphthylthio)-4-azatricyclo[5.2.1.02,6]decane-3,5-dione, (5R)-5-[(1S)-1,2-dihydroxyethyl]-3,4-dihydroxyfuran-2(5H)-one, 2-naphthalenethiol, (9H-xanthen-9-ylthio)acetic acid, 3-({(2S)-2-[(2R)-3,4-dihydroxy-5-oxo-2, 5-dihydrofuran-2-yl]-2-hydroxyethoxy}carbonyl)bicyclo [2.2.1]hept-5-ene-2-carboxylic acid, adamantane-1,3,5-tricarboxylic acid, 4-hydroxy-4-azatricyclo[5.2.1.0$^{2,6}$]dec-8-ene-3,5-dione, 3-[(4-hydroxy-3,5-dioxo-4-azatricyclo [5.2.1.0 2,6]dec-8-yl)thio]propanoic acid, 6-[(2-carboxyethyl)thio]-3-({(2S)-2-[(2R)-3,4-dihydroxy-5-oxo-2,5-dihydrofuran-2-yl]-2-hydroxyethoxy}carbonyl)bicyclo [2.2.1]heptane-2-carboxylic acid, 4-mercaptotetracyclo [4.4.0.1$^{2,5}$.1$^{7,10}$]dodec-8-ene-3-carboxylic acid, 3-{[2-(acryloyloxy)ethoxy]carbonyl}-6-(naphthylthio)bicyclo [2.2.1]heptane-2-carboxylic acid, (2S)-2-[(2R)-3,4-dihydroxy-5-oxo-2,5-dihydrofuran-2-yl]-2-hydroxyethyl 3-(bicyclo[2.2.1]hept-5-en-2-ylthio)propanoate, 4-hydroxytetracyclo[4.4.0.1$^{2,5}$.1$^{7,10}$]dodec-8-ene-3-carboxylic acid, 2-hydroxy-5-oxo-4-oxatricyclo[4.2.1.0$^{3,7}$]nonane-9-carboxylic acid, 2-bromo-5-oxo-4-oxatricyclo[4.2.1.0$^{3,7}$]nonane-9-carboxylic acid, adamantane-1,3-dicarboxylic acid, 3-[(3,5-dioxo-4-azatricyclo[5.2.1.0$^{2,6}$]dec-8-yl)thio] propanoic acid, 4-[(3,5-dioxo-4-azatricyclo[5.2.1.0$^{2,6}$]dec-8-en-4-yl)oxy]-2-methylene-4-oxobutanoic acid, 3-(tetracyclo[4.4.0.1$^{2,5}$.1$^{7,10}$]dodec-8-en-3-ylthio)propanoic acid, 5-(bicyclo[2.2.1]hept-5-en-2-ylthio)bicyclo[2.2.1]heptane-2-carboxylic acid, (2S)-2-[(2R)-3,4-dihydroxy-5-oxo-2,5-dihydrofuran-2-yl]-2-hydroxyethyl acrylate, 5-[(2-carboxyethyl)thio]bicyclo[2.2.1]heptane-2,3-dicarboxylic acid, 5,6-dibromo-2-(2-hydroxyethyl)bicyclo[2.2.1]heptane-2-carboxylic acid, 3-[(4-hydroxypiperidin-1-yl)carbonyl] bicyclo[2.2.1]hept-5-ene-2-carboxylic acid, 9-hydroxytetracyclo[4.4.0.1$^{2,5}$.1$^{7,10}$]dodecane-3-carboxylic acid, bromobenzoic acid, 3-mercaptobicyclo[2.2.1]hept-5-ene-2-carboxylic acid, 3-[(3,5-dioxo-4-oxatricyclo[5.2.1.0$^{2,6}$]dec-8-yl)thio]propanoic acid, 3-({4-[2-(acryloyloxy) ethyl]-3,5-dioxo-4-azatricyclo[5.2.1.0$^{2,6}$]dec-8-yl}thio) propanoic acid, bicyclo[2.2.1]hept-5-ene-2,3-dicarboxylic acid, 3-(tricyclo[5.2.1.0$^{2,6}$]dec-4-en-8-ylthio)propanoic acid, 3-{[(hydroxymethyl)amino]carbonyl}bicyclo[2.2.1] hept-5-ene-2-carboxylic acid, 3-{[9-(acryloyloxy)tetracyclo [4.4.0.1$^{2,5}$.1$^{7,10}$]dodec-3-yl]thio}propanoic acid, 5-[(2-carboxyethyl)thio]bicyclo[2.2.1]heptane-2-carboxylic acid, 3-[(5'-oxodihydro-3'H-spiro[bicyclo[2.2.1]heptane-2,2'-furan]-6-yl)thio]propanoic acid, 5-(acryloyloxy)-6-hydroxybicyclo[2.2.1]heptane-2,3-dicarboxylic acid, 5-[(1-carboxyethyl)thio]bicyclo[2.2.1]heptane-2-carboxylic acid, 3-(bicyclo[2.2.1]hept-5-en-2-ylthio)propanoic acid, 3-{[(2-hydroxycyclopentyl)oxy]carbonyl}bicyclo[2.2.1]hept-5-ene-2-carboxylic acid, 3-({6-[(acryloyloxy)methyl]tetracyclo[4.4.0.1$^{2,5}$.1$^{7,10}$]dodec-3-yl]}thio)propanoic acid, (2S)-2-[(2R)-3,4-dihydroxy-5-oxo-2,5-dihydrofuran-2-yl]-2-hydroxyethyl butyrate, 3-[(6-{[(methylsultonyl)amino] methyl}bicyclo[2.2.1]hept-2-yl)thio]propanoic acid, 2-(acryloyloxy)-5-oxo-4-oxatricyclo[4.2.1.0$^{3,7}$]nonane-9-carboxylic acid, 6-[(2-carboxyethyl)thio]-3-(methoxycarbonyl)bicyclo[2.2.1]heptane-2-carboxylic acid, 5-{[3-(acryloyloxy)propyl]thio}bicyclo[2.2.1]heptane-2,3-dicarboxylic acid, 5-(cyclopentylthio)bicyclo[2.2.1]heptane-2-carboxylic acid, adamantane-1-carboxylic acid, 3-{[9-(acryloyloxy)tricyclo[5.2.1.0$^{2,6}$]dec-3-yl]thio}propanoic acid, 3-{[4-(acryloyloxy)tricyclo[5.2.1.0$^{2,6}$]dec-8-yl]thio}propanoic acid, 3-{[2-(acryloyloxy)ethoxy]carbonyl}-6-((2-carboxyethyl) thio]bicyclo[2.2.1]heptane-2-carboxylic acid, 3-({5-[(acryloyloxy)methyl]tricyclo[5.2.1.0$^{2,6}$]dec-8-yl}thio)propanoic acid, bicyclo[2.2.1]hept-5-ene-2-carboxylic acid, 3-({9-[2-(acryloyloxy)ethoxy]tricyclo[5.2.1.0$^{2,6}$]dec-3-yl}thio)propanoic acid, 3-{6-(acryloyloxy)bicyclo[2.2.1]hept-2-yl] thio}propanoic acid, 5-(acryloyloxy)-6-hydroxybicyclo [2.2.1]heptane-2-carboxylic acid, 3-({6-[(acryloyloxy) methyl]bicyclo[2.2.1]hept-2-yl}thio)propanoic acid, 3-[(6-{ [2-(acryloyloxy)ethoxy]carbonyl}bicyclo[2.2.1]hept-2-yl) thio]propanoic acid, 2-methylene-4-oxo-4-(tricyclo [5.2.1.02,6]dec-8-en-3-ylmethoxy)butanoic acid, 3-{[2-(acryloyloxy)ethoxy]carbonyl}bicyclo[2.2.1]hept-5-ene-2-carboxylic acid, [(1S,4R)-7,7-dimethyl-2-oxobicyclo[2.2.1] hept-1-yl]methanesulfonic acid, 4-(bicyclo[2.2.1]hept-5-en-2-ylmethoxy)-2-methylene-4-oxobutanoic acid, 3-(acryloylthio)propanoic acid, cyclohexane-1,2-dicarboxylic acid and (2S)-2-[(2R)-3,4-dihydroxy-5-oxo-2,5-dihydrofuran-2-yl]-2-hydroxyethyl hexadecynate.

The most common example of Ligand B is an acryloyl group or a (meth)acryloyl group. Other examples of B are compounds containing vinyl, allyl, stryl, or a cyclic olefinic group, which are capable of undergoing a combining reaction with other reactive functional groups such as ethylenically unsaturated groups, a —SiH group or a —SH group of other MU and/or PU. This reaction generally occurs in the presence of a suitable initiator or catalyst employed in formulating these compositions. Preferred examples of B are acryloyl, methacryloyl, 3-butenoate, 4-pentenoate, vinyl sulfonate, styrene sulfonate, vinylphenolate, vinyl benzoate, 2-(acryloyloxy)ethanolate, 3-(acryloyloxy)propanolate and bicyclo [2.2.1]hept-5-ene-2-carboxylate.

Preferred examples of Ligand C are an oxygen atom, a sulfur atom, methoxy, ethoxy, propoxy, butoxy, 2-carboxyethanethiolate, and naphthalenethiolate.

Specific, non-limiting examples of Ligand A of the metal-containing precursor unit is selected individually or in combination from the group consisting of 8-(2-naphthylthio)-3, 5-dioxo-4-azatricyclo[5.2.1.0$^{2,6}$]decan-4-olate, (5R)-5-[(1S)-1,2-dihydroxyethyl]-3-hydroxy-4-oxo-4,5-dihydrofuran-2-olate, 2-naphthalenethiolate, (9H-xanthen-9-ylthio)acetate, 3-({(2S)-2-[(2R)-3,4-dihydroxy-5-oxo-2,5-dihydrofuran-2-yl]-2-hydroxyethoxy}carbonyl)bicyclo [2.2.1]hept-5-ene-2-carboxylate, adamantane-1,3,5-tricarboxylate, 3,5-dioxo-4-azatricyclo[5.2.1.0$^{2,6}$]dec-8-en-4-olate, 3-[(4-hydroxy-3,5-dioxo-4-azatricyclo[5.2.1.02,6] dec-8-yl)thio]propanoate, 6-[(2-carboxyethyl)thio]-3-({ (2S)-2-[(2R)-3,4-dihydroxy-5-oxo-2,5-dihydrofuran-2-yl]-2-hydroxyethoxy}carbonyl)bicyclo[2.2.1]heptane-2-carboxylate, 4-mercaptotetracyclo[4.4.0.1$^{2,5}$.1$^{7,10}$]dodec-8-ene-3-carboxylate, 3-{[2-(acryloyloxy)ethoxy]carbonyl}-6-(naphthylthio)bicyclo[2.2.1]heptane-2-carboxylate, (5R)-5-[(1S)-2-{[3-(bicyclo[2.2.1]hept-5-en-2-ylthio)propanoyl] oxy}-1-hydroxyethyl]-3-hydroxy-4-oxo-4,5-dihydrofuran-2-olate, 4-hydroxytetracyclo[4.4.0.1$^{2,5}$.1$^{7,10}$]dodec-8-ene-3-carboxylate, 2-hydroxy-5-oxo-4-oxatricyclo[4.2.1.0$^{3,7}$] nonane-9-carboxylate, 2-bromo-5-oxo-4-oxatricyclo [4.2.1.0$^{3,7}$]nonane-9-carboxylate, adamantane-1,3-dicarboxylate, 3-[(3,5-dioxo-4-azatricyclo[5.2.1.0$^{2,6}$]dec-8-yl)thio]propanoate, 4-[(3,5-dioxo-4-azatricyclo[5.2.1.0$^{2,6}$] dec-8-en-4-yl)oxy]-2-methylene-4-oxobutanoate, 3-(tetracyclo[4.4.0.1$^{2,5}$.1$^{7,10}$]dodec-8-en-3-ylthio)propanoate, 5-(bicyclo[2.2.1]hept-5-en-2-ylthio)bicyclo[2.2.1] heptane-2-carboxylate, (5R)-5-[(1S)-2-(acryloyloxy)-1-hydroxyethyl]-3-hydroxy-4-oxo-4,5-dihydrofuran-2-olate, 5-[(2-carboxyethyl)thio]bicyclo[2.2.1]heptane-2,3-dicarboxylate, 5,6-dibromo-2-(2-hydroxyethyl)bicyclo[2.2.1] heptane-2-carboxylate, 3-[(4-hydroxypiperidin-1-yl)carbonyl]bicyclo[2.2.1]hept-5-ene-2-carboxylate, 9-hydroxytetracyclo[4.4.0.1$^{2,5}$.1$^{7,10}$]dodecane-3-carboxylate, bromobenzoate, 3-mercaptobicyclo[2.2.1]hept-5-ene-2-carboxylate, 3-[(3,5-dioxo-4-oxatricyclo[5.2.1.0$^{2,6}$]dec-8-yl)thio]propanoate, 3-({4-[2-(acryloyloxy)ethyl]-3,5-dioxo-4-azatricyclo[5.2.1.0$^{2,6}$]dec-8-yl}thio)propanoate, bicyclo [2.2.1]hept-5-ene-2,3-dicarboxylate, 3-(tricyclo[5.2.1.0$^{2,6}$] dec-4-en-8-ylthio)propanoate, 3-{[(hydroxymethyl)amino]

carbonyl}bicyclo[2.2.1]hept-5-ene-2-carboxylate, 3-{[9-(acryloyloxy)tetracyclo[4.4.0.1$^{2,5}$.1$^{7,10}$]dodec-3-yl]thio}propanoate, 5-[(2-carboxyethyl)thio]bicyclo[2.2.1]heptane-2-carboxylate, 3-[(5'-oxodihydro-3'H-spiro[bicyclo[2.2.1]heptane-2,2'-furan]-6-yl)thio]propanoate, 5-(acryloyloxy)-6-hydroxybicyclo[2.2.1]heptane-2,3-dicarboxylate, 5-[(1-carboxyethyl)thio]bicyclo[2.2.1]heptane-2-carboxylate, 3-(bicyclo[2.2.1]hept-5-en-2-ylthio)propanoate, 3-{[(2-hydroxycyclopentyl)oxy]carbonyl}bicyclo[2.2.1]hept-5-ene-2-carboxylate, 3-({6-[(acryloyloxy)methyl]tetracyclo[4.4.0.1$^{2,5}$.1$^{7,10}$]dodec-3-yl]}thio)propanoate, (5R)-5-[(1S)-2-(butyryloxy)-1-hydroxyethyl]-3-hydroxy-4-oxo-4,5-dihydrofuran-2-olate, 3-[(6-{[(methylsulfonyl)amino]methyl}bicyclo[2.2.1]hept-2-yl)thio]propanoate, 2-(acryloyloxy)-5-oxo-4-oxatricyclo[4.2.1.0$^{3,7}$]nonane-9-carboxylate, 6-[(2-carboxyethyl)thio]-3-(methoxycarbonyl)bicyclo[2.2.1]heptane-2-carboxylate, 5-{[3-(acryloyloxy)propyl]thio}bicyclo[2.2.1]heptane-2,3-dicarboxylate, 5-(cyclopentylthio)bicyclo[2.2.1 ]heptane-2-carboxylate, adamantane-1-carboxylate, 3-{[9-(acryloyloxy)tricyclo[5.2.1.0$^{2,6}$]dec-3-yl]thio}propanoate, 3-{[4-(acryloyloxy)tricyclo[5.2.1.0$^{2,6}$]dec-8-yl]thio}propanoate, 3-{[2-(acryloyloxy)ethoxy]carbonyl}-6-[(2-carboxyethyl)thio]bicyclo[2.2.1]heptane-2-carboxylate, 3-({5-[(acryloyloxy)methyl]tricyclo[5.2.1.0$^{2,6}$]dec-8-yl}thio)propanoate, bicyclo[2.2.1]hept-5-ene-2-carboxylate, 3-({9-[2-(acryloyloxy)ethoxy]tricyclo[5.2.1.0$^{2,6}$]dec-3-yl}thio)propanoate, 3-{[6-(acryloyloxy)bicyclo[2.2.1]hept-2-yl]thio}propanoate, 5-(acryloyloxy)-6-hydroxybicyclo[2.2.1]heptane-2-carboxylate, 3-({6-[(acryloyloxy)methyl]bicyclo[2.2.1]hept-2-yl}thio)propanoate, 3-[(6-{[2-(acryloyloxy)ethoxy]carbonyl}bicyclo[2.2.1]hept-2-yl)thio]propanoate, 2-methylene-4-oxo-4-(tricyclo[5.2.1.02,6]dec-8-en-3-ylmethoxy)butanoate, 3-{[2-(acryloyloxy)ethoxy]carbonyl}bicyclo[2.2.1]hept-5-ene-2-carboxylate, [(1S,4R)-7,7-dimethyl-2-oxobicyclo[2.2.1]hept-1-yl]methanesulfonate, 4-(bicyclo[2.2.1]hept-5-en-2-ylmethoxy)-2-methylene-4-oxobutanoate, 3-(acryloylthio)propanoate, cyclohexane-1,2-dicarboxylate or (5R)-5-[(1S)-2-(hexadecyloxy)-1-hydroxyethyl]-3-hydroxy-4-oxo-4,5-dihydrofuran-2-olate.

Specific, non-limiting examples of MU include zirconium 6-(2-naphthylthio)bicyclo[2.2.1]heptane-2-carboxylate triacrylate, hafnium [(1S,4R)-7,7-dimethyl-2-oxobicyclo[2.2.1]hept-1-yl]methanesulfonate triacrylate, zirconium bicyclo[2.2.1]hept-5-ene-2-carboxylate, zirconium 6-(2-naphthylthio)bicyclo[2.2.1]heptane-2-carboxylate 2-naphthalenethiolate diacrylate, zirconium di-bicyclo[2.2.1]hept-5-ene-2-carboxylate diacrylate, zirconium bicyclo[2.2.1]hept-5-ene-2-carboxylate triacrylate, zirconium 2-bromo-5-oxo-4-oxatricyclo[4.2.1.0$^{3,7}$]nonane-9-carboxylate triacrylate, zirconium 3-({(2S)-2-[(2R)-3,4-dihydroxy-5-oxo-2,5-dihydrofuran-2-yl]-2-hydroxyethoxy}carbonyl)bicyclo[2.2.1]hept-5-ene-2-carboxylate triacrylate, zirconium bicyclo[2.2.1]hept-5-ene-2,3-dicarboxylate triacrylate, zirconium 1-adamantanecarboxylate triacrylate, germanium 6-(2-naphthylthio)bicyclo[2.2.1]heptane-2-carboxylate triacrylate, titanium 6-(2-naphthylthio)bicyclo[2.2.1]heptane-2-carboxylate triacrylate, niobium 6-(2-naphthylthio)bicyclo[2.2.1]heptane-2-carboxylate triacrylate, and zirconium [(1S,4R)-7,7-dimethyl-2-oxobicyclo[2.2.1]hept-1-yl]methanesulfonate triacrylate.

The term prepolymer unit (PU) refers to a monomer unit or an oligomer where oligomer refers to combination of monomer units joined together. The prepolymer may contain many monomer units and is capable of further reactions to be incorporated in the final material. Examples of such monomer units/oligomers are based on one or more of the following types: acrylate, ester, vinyl alcohol, urethane, urea, carbonate, pyranose, siloxane, urea-formaldehyde and melamine-formaldehyde. The PU contains at least two terminal and/or pendant reactive functional groups. These can participate in combining reactions with metal-containing precursor units (MU). Examples of such terminal and pendant groups are a vinyl group, an allyl group, a (meth)acryloyl group, a SiH group and a —SH group. The monomer units of the PU may be selected to be compatible with MU so that the composition forms an optically clear film or article before curing.

Specific, non-limiting examples of prepolymer unit (PU) include urethane acrylate oligomer. The term urethane acrylate oligomer refers to a class of compounds that contain urethane linkages and have (meth)acrylate functional groups such as urethane multi(meth)acrylate, multiurethane (meth)acrylate, and multiurethane multi(meth)acrylate. Types of urethane (meth)acrylate oligomers have been described by Coady et al. in U.S. Pat. No. 4,608,409 and by Chisholm et al. in U.S. Pat. No. 6,844,950 and are incorporated herein as references. Other non-limiting examples of prepolymer unit (PU) include 1,6-hexanediol di(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethylolpropane tetra(meth)acrylate, pentaerythritol tri(meth)acrylate, pentaerythritol tetra(meth)acrylate, dipentaerythritol penta-/hexa-(meth)acrylate, isocyanurate tri(meth)acrylate, bis(2-hydroxyethyl)-isocyanurate di(meth)acrylate, 1,3-butanediol tri(meth)acrylate, 1,4-butanediol tri(meth)acrylate, neopentyl glycol di(meth)acrylate, (meth)acrylate modified-urea-formaldehyde, melamine-formaldehyde, cellulose and siloxanes having vinyl, allyl, (meth) acryloyol, or hydro-silane terminal or pendent functional groups. Specific examples of such siloxane prepolymer units include vinyl-terminated polydimethylsiloxanes (CAS 68083-19-2), vinyl terminated diphenylsiloxane-dimethylsiloxane copolymer (CAS 68951-96-2), vinyl terminated polyphenylmethylsiloxane (CAS 225927-21-9), vinyl terminated diethylsiloxane-dimethylsiloxane copolymer (Gelest Code EDV-2025), vinylmethylsiloxane-dimethylsiloxane copolymers, trimethylsiloxy terminated (CAS 67762-94-1), vinylmethylsiloxane-dimethylsiloxane copolymers, vinyl terminated (CAS 68083-18-1), vinylmethylsiloxane-homopolymers (Gelest Code VMS-oo5 and VMS-T11). Vinyl T-structured polymers (Gelest Code VTT-106 and MTV-124), vinylmethylsiloxane terpolymers (CAS 597543-32-3), vinylmethoxysiloxane homopolymer (CAS 131298-48-1), vinylethoxysiloxane homopolymer (CAS 29434-25-1), vinyl-propylethoxysiloxane copolymer (Gelest Code VPE-005), hydride terminated poly-dimethyl siloxanes (CAS 70900-21-9), methylhydrosiloxane-dimethylsiloxane copolymers, trimethylsiloxy terminated (CAS 68037-59-2), methylhydrosiloxane-dimethylsiloxane copolymers, hydride terminated (CAS 69013-23-6), polymethylhydrosiloxanes, trimethylsiloxy terminated (CAS 63148-57-2), polyethylhydrosiloxane, triethylsiloxy terminated (CAS 24979-95-1), polyphenyl-(dimethylhydroxysiloxy)siloxane, hydride terminated (Gelest Code HDP-111) and hydride Q resin (CAS 68988-57-8).

A non-limiting example of a preferred prepolymer unit is urethane acrylate oligomer, commercially available from Sartomer Company.

The prepolymer often has an average molecular weight between 70 and 10$^7$ Daltons. A more preferred upper limit of molecular weight is 10$^6$ Daltons. The most preferred upper limit of molecular weight is 10$^5$ Daltons.

Preferably the composition comprises between about 5-90 weight % (on the basis of total solids) of metal-containing precursor unit (MU).

Another embodiment is a composition comprising MU and further comprising a metal (meth)acrylate, where the metal of the metal (meth)acrylate has a formal valency of at least 4. Specific examples of the metal (meth)acrylate are zirconium, hafnium, germanium, niobium and titanium (meth)acrylate. An important criterion in the selection of the MU, PU (if included), and metal (meth)acrylate is that they are compatible with each other, that is, they are capable of undergoing combining reactions with each other and the composition forms an optically clear film or article as measured by the Transmittance Test. Metal (meth) acrylate can be added to the compositions to for the purpose of improving scratch resistance and hardness of the cured films.

In another embodiment, this invention provides compositions comprising metal-containing precursor unit (MU) and a catalyst or an initiator capable of inducing combining reactions of ethylenically unsaturated groups of two or more MUs to form an optically clear film or article. Typically, the composition is optically clear even before it is formed into a film or article (before curing) and remains optically clear when it is cured.

The composition may further comprise an organic monomer (M) containing one reactive functional group. For instance, an acrylate monomer may be used to improve the physical properties of the final film or article. The acrylate monomer is incorporated into the film or article by combining reactions with MU and or PU.

The novel invention further comprises a catalyst or an initiator capable of inducing a combining reaction in the presence of light or heat. Examples of photoinitiators include but are not limited to 2-hydroxy-2-methyl-1-phenylpropan-1-one, 1-hydroxycyclohexyl phenyl ketone (Irgacure 184 from Ciba Specialty Chemical), a blend of 1-hydroxycyclohexylphenylketone and benzophenone (Irgacure 500 from Ciba Specialty Chemical), 2,4,4-trimethylpentyl phosphine oxide (Irgacure 1800, 1850, and 1700 from Ciba Specialty Chemical), 2,2-dimethoxyl-2-acetophenone (Irgacure 651 from Ciba Specialty Chemical), bis(2,4,6-trimethyl benzoyl)phenyl-phophine oxide (Irgacure 819 from Ciba Specialty Chemical), 2-methyl-1-[4-(methylthio)phenyl]-2-morphorinopropane-1-on (Irgacure 907), (2,4,6-trimethylbenzoyl)diphenyl phosphine oxide (Lucerin TPO from BASF), ethoxy(2,4,6-trimethylbenzoyl)phenyl phosphine oxide (Lucerin TPO-L from BASF), a blend of phosphine oxide, α-hydroxy ketone and a benzophenone derivative (ESACURE KTO46 from Sartomer), 2-hydroxy-2-methyl-1-phenylpropane-1-on (Darocur 1173 from Merck), benzophenone, 2-chlorothioxanthone, 2-methylthioxanthone, 2-isopropylthioxanthone, benzodimethyl ketal, 1,1,1-trichloroacetophenone, diethoxyacetophenone, m-chloroacetophenone, propiophenone, anthraquinone, and dibenzosuberone.

Non-limiting examples of catalysts or initiators useful in inducing a combining reaction the presence of heat include but are not limited to organic peroxides such as benzoyl peroxide, diacylperoxides, peroxydicarbonates, alkylperesters, alkyl peroxides, perketals, ketoneperoxides, and alkylhydroperoxides as well as azo compounds such as azobisisobutyronitrile and 1,1'-azobis(cyclohexanecarbonitrile). Examples of catalysts useful in inducing a combining reaction involving hydrosilane-terminated PU include chloroplatininc acid hexahydrate (CAS 18497-13-7) and platinum (0)-1,3-divinyl-1,1,3,3-tetramethyldisiloxane complex (CAS 68478-92-2).

The catalyst or initiator is typically employed in the amounts of about 0.0001 to 20% by weight and more preferably about 1% to 10%. The amount of catalyst or initiator is based on the combined weights of MU, PU, metal(meth) acrylate and M.

The composition may further comprise a suitable solvent. The choice of solvent for the formulation and the concentration thereof depends principally on the type of functionalities incorporated in the metal-containing precursor unit (MU) and prepolymer unit (PU) along with the catalyst or initiator and the coating method. The solvent should be inert, should dissolve or uniformly disperse all the components in the composition, should not undergo any chemical reaction with the components, and should be removable on drying after coating. The solvent is generally present in the composition in an amount of from about 1 to about 90% by weight, and typically is present in the composition in an amount of 10-60 weight %. Suitable solvents for the composition may include non-aqueous solvents such as ketones, ethers, esters and alcohols. Examples of ketones, ethers, and esters include 2-butanone, 3-methyl-2-butanone, 2-heptanone, cyclopentanone, cyclohexanone, 2-methoxy-1-propylene acetate, 2-methoxyethanol, 2-ethoxyethanol, 2-ethoxyethyl acetate, 1-methoxy-2-propyl acetate, 1,2-dimethoxy ethane ethyl acetate, cellosolve acetate, methyl lactate, ethyl lactate, n-butyl acetate, methyl pyruvate, ethyl pyruvate, methyl 3-methoxypropionate, ethyl 3-methoxypropionate, N-methyl-2-pyrrolidone, 1,4-dioxane, ethylene glycol monoisopropyl ether, diethylene glycol monoethyl ether, diethylene glycol monomethyl ether, diethylene glycol dimethyl ether, and the like. Examples of alcohol solvents include methanol, ethanol, 1-propanol, 2-propanol, butanol, and the like.

The composition may further comprise conventional additives, such as dyes, adhesion promoters, buffers, sensitizers, stabilizers, anti-oxidants, colorants, and surfactants. Similarly, a dye may be used to improve the sensitivity of the coating to actinic rays required for the purpose of curing the film.

Examples of antioxidants include but are not limited to hindered phenols (Irganox 1010 from Ciba Specialty Chemical), sulfides, organoboron compounds, and N,N'-hexamethylenebis(3,5-di-tert-butyl-4-hydroxyhydrocinnamamide) (Irganox 1098 from Ciba Specialty Chemical).

Examples of photostabilizers include but are not limited to poly[(6-morpholino-s-triazine-2,4-diyl)][(2,2,6,6-tetramethyl-4-piperidyl)imino]-hexamethylene[2,2,6,6-tetramethyl-4-piperidyl]imino (Cyasorb UV-3346 from Cytec).

Examples of free radical scavengers include but are not limited to oxygen, hindered amine light stabilizers, hindered phenols, 2,2,6,6-tetramethyl-1-piperidinyloxy free radical (TEMPO), and nitrones.

A person skilled in the art will be able to choose the appropriate desired additive and its concentration.

Another embodiment is a process for preparing a formulation for the composition by mixing the metal containing precursor unit (MU), the prepolymer unit (PU), and the suitable catalyst/initiator compound along with a suitable solvent and any conventional additive.

Another embodiment is a process for applying or casting the composition in the form of a film or a three-dimensional article and curing said film or article. The composition is applied uniformly onto a suitable substrate, such as metal, plastic, wood, paper, glass, and ceramic, by known coating methods. For example, the coatings may be applied by dipping (or dip coating), knife coating, lamination, brushing, spraying, spin-coating, die coating, micro-gravure coating, cast-transfer or reverse-roll coating. After the coating operation, the solvent is generally removed by drying. The drying step is typically a heating step where the coating and substrate are heated to a temperature of about 50° C. to 150° C. for about a few seconds to a few minutes; preferably for about 5 seconds to 30 minutes depending on the thickness, the heating element, and end use of the coating. The thickness range of the dried coating generally covers values less than 10 mm.

A three-dimensional article can be cast from the composition by employing a suitable molding technique.

For the production of cured films or articles, the cast film or article can be exposed to a high energy radiation source. Radiation sources which can be used are all sources that emit radiation to which the suitable catalyst or initiator is sensitive. Examples include high pressure mercury lamp, excimer lasers, electron beams, and x-rays sources. Total exposure time vary from about 5 seconds to 30 minutes depending on intensity of the radiation, thickness of coating, nature of the metal-containing precursor unit (MU) and the prepolymer unit (PU), and sensitivity of the catalyst or initiator used. The composition may be exposed to radiation whether it is in a solvent-containing state or in a solvent-free state after evaporating the solvent fraction. A fully cured film or article does not show any solubility in acetone as determined by mechanically rubbing a cotton swab soaked in acetone. Depending on the application, a post-curing bake may be required.

Alternatively, a cured film or article can be produced by heating the cast film or article to a temperature of about 50° C. to 300° C. for about a few seconds to a few minutes; preferably for about 5 seconds to 30 minutes depending on the thickness of coating, nature of the metal-containing precursor (MU) and the prepolymer unit (PU), and efficiency of the catalyst or initiator.

Another embodiment is an optically clear film or article. The film or article typically has transparency greater than ninety percent, an index of refraction in the range of 1.5 to 1.8 in the 400-700 nm range of light and 1.5 to 2.4 in the 150-400 nm range of light. Unless modified with a dye, the film and article of this invention show no significant coloration in the visible range of light. The cured film has good retention of optical clarity. The cured film also shows excellent adhesion to a variety of substrates such as silicon, metal, wood, and other plastics or films such as polyethylene terephthalate (PET) or triacetyl cellulose (TAC) to form laminates and composites. The cured films and the articles also show excellent hardness, scratch resistance, and resistance to most of organic solvents.

EXAMPLES

The invention is further illustrated by, but not limited to, the following examples.

Preparative Example 1

In a 40-mL amber vial, urethane acrylate, Catalog No. CN9010 from Sartomer Company (30.88 g) was dissolved in 2-butanone (10.45 g). The resulting mixture was homogeneous and clear after 20 minutes of rolling on a two mill roller at maximum speed.

Comparative Example 1

A 2-butanone solution of urethane acrylate as prepared in Preparative Example 1 (0.53 g) was added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after stirring. The homogeneous and clear solution was filtered through a 0.2 μm PTFE syringe filter to remove any extraneous impurities such as dust particles. The solution was coated onto a Luminor T PET film from Toray (75 μm thick) with a wire-wound coater (3 mil diameter), Catalog No. AR-4103 from BYK Gardner to a wet film thickness of about 5 μm and dried for 60 seconds at 80° C. in an oven. This dried film was cured by a Blak-ray UV lamp Model 100 AP for 15 minutes and then tested to determine its scratch resistance, hardness, chemical resistance, and refractive index (see Table 1). The solution is stable for more than 6 months.

Completion of the curing reaction for all the films in the above examples up through and including Example 16 was determined by mechanically rubbing a cotton swab soaked in acetone. Fully cured films did not show any solubility in acetone. This test was also performed to test the chemical resistance of a given formulation. If no damage was observed by the naked eye, the coating is cured. Relative scratch resistance of a film was measured by scratching the coated PET film with fine steel wool (Grade #0000) four times with a load of 400 g and 800 g. The naked eye observed range of scratch resistance is from 3+ to 1 where 3+ is excellent (no scratches at 400 or 800 g), 3 is very good (no scratching at 400 g, some scratching at 800 g), 2 is good (some scratching at 400 g and 1 is poor (severe scratching). Pencil hardness (PH) of a film was measured by pencils of different hardness starting with 4H and decreasing in hardness to 6B until pencil did not mark film as determined with the naked eye. Refractive index measurements were performed using a Bausch and Lomb Abbe Refractometer model ABBE-3L at 25° C. using 1-bromonaphthalene as contact liquid.

Preparative Example 2

In a 20-mL glass vial equipped with a stir bar, zirconium n-propoxide 70 wt % solution in n-propanol, Catalog No. AKZ975 from Gelest, Inc. (2.57 g), was added. While stirring, the solution was cooled in an ice bath to 5° C. and a rubber septum was placed on top of the vial. 5-Norbornene-2-carboxylic acid, Catalog No. 147230 from Aldrich Co. (3.04 g) dissolved in tetrahydrofuran (1.49 g) was added dropwise to the vial by syringe over a period of 15 minutes. The solution was stirred at room temperature for 12 hours rotovapped with 2-butanone (2.5 mL total) at 40° C. for 30 minutes to a 70 wt % solution.

Example 1

A 2-butanone solution of zirconium bicyclo[2.2.1]hept-5-ene-2-carboxylate as prepared in Preparative Example 2 (0.06 g) and a 2-butanone solution of urethane acrylate as prepared in Preparative Example 1 (0.48 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1. In this example, 10 weight % zirconium bicyclo[2.2.1]hept-5-ene-2-carboxylate formed a homogeneous solution, which was stable for at least 2 months upon storage at room temperature. The coating of 10 weight % zirconium bicyclo[2.2.1]hept-5- ene-2-carboxylate improved refractive index and resulted in comparable scratch resistance to Comparative Example 1 (see Table 1).

Preparative Example 3

In a 20-mL glass vial equipped with a stir bar, zirconium n-propoxide 70 wt % solution in n-propanol, Catalog No. AKZ975 from Gelest, Inc. (3.41 g), was added. While stirring, the solution was cooled in an ice bath to 5° C. and a rubber septum was placed on top of the vial. 5-Norbornene-2-carboxylic acid, Catalog No.147230 from Aldrich Co. (2.01 g) and acrylic acid, Catalog No. 147230 from Aldrich Co. (1.05 g), were dissolved in tetrahydrofuran (1.37 g) and added dropwise to the vial by syringe over a period of 15 minutes. The solution was stirred at room temperature for 12 hours then rotovapped with 2-butanone (2.5 mL total) at 40° C. for 30 minutes to a 60 wt % solution.

Example 2

A 2-butanone solution of zirconium di-bicyclo[2.2.1]hept-5-ene-2-carboxylate diacrylate as prepared in Preparative Example 3 (0.20 g) and a 2-butanone solution of urethane acrylate as prepared in Preparative Example 1 (0.38 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 30 weight % zirconium di-bicyclo[2.2.1]hept-5-ene-2-carboxylate diacrylate formed a homogeneous solution, which was stable for at least 3 months upon storage at room temperature. The coating of 30 weight % zirconium di-bicyclo[2.2.1]hept-5-ene-2-carboxylate diacrylate improved refractive index and resulted in comparable scratch resistance to Comparative Example 1 (see Table 1).

Preparative Example 4

In a 20-mL glass vial equipped with a stir bar, zirconium n-propoxide 70 wt % solution in n-propanol, Catalog No. AKZ975 from Gelest, Inc. (2.56 g), was added. While stirring, the solution was cooled in an ice bath to 5° C. and a rubber septum was placed on top of the vial. 5-Norbornene-2-carboxylic acid, Catalog No. 147230 from Aldrich Co. (0.75 g) and acrylic acid, Catalog No. 147230 from Aldrich Co. (1.71 g), were added dropwise to the vial by syringe over a period of 15 minutes. The solution was stirred at room temperature for 12 hours then rotovapped with 2-butanone (2.5 mL total) at 40° C. for 30 minutes to a 78 wt % solution.

Example 3

A 2-butanone solution of zirconium bicyclo[2.2.1]hept-5-ene-2-carboxylate triacrylate as prepared in Preparative Example 4 (0.51 g) was added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 100 weight % zirconium bicyclo[2.2.1]hept-5-ene-2-carboxylate triacrylate formed a homogeneous solution, which was stable for at least 3 months upon storage at room temperature. The coating of 100 weight % zirconium bicyclo[2.2.1]hept-5-ene-2-carboxylate triacrylate improved refractive index and decreased scratch resistance and pencil hardness (PH) compared to Comparative Example 1 (see Table 1).

Example 4

A 2-butanone solution of zirconium bicyclo[2.2.1]hept-5-ene-2-carboxylate triacrylate as prepared in Preparative Example 4 (0.41 g) and a 2-butanone solution of urethane acrylate as prepared in Preparative Example 1 (0.16 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 75 weight % zirconium bicyclo[2.2.1]hept-5-ene-2-carboxylate triacrylate formed a homogeneous solution, which was stable for at least 3 months upon storage at room temperature. The coating of 75 weight % zirconium bicyclo[2.2.1]hept-5-ene-2-carboxylate triacrylate improved refractive index and decreased scratch resistance and pencil hardness compared to Comparative Example 1 (see Table 1).

Example 5

A 2-butanone solution of zirconium bicyclo[2.2.1]hept-5-ene-2-carboxylate triacrylate as prepared in Preparative Example 4 (0.26 g) and a 2-butanone solution of urethane acrylate as prepared in Preparative Example 1 (0.26 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium bicyclo[2.2.1]hept-5-ene-2-carboxylate triacrylate formed a homogeneous solution, which was stable for at least 3 months upon storage at room temperature. The coating of 50 weight % zirconium bicyclo[2.2.1]hept-5-ene-2-carboxylate triacrylate improved refractive index and slightly decreased scratch resistance and pencil hardness compared to Comparative Example 1 (see Table 1).

Addition of PU in Examples 4 and 5 shows improvement in hardness and scratch resistance compared to the formulation of Example 3, which does not contain any PU.

Preparative Example 5

In a 50-mL one neck round bottom flask, 2-naphthalenethiol, Catalog No. 270849 from Aldrich Co. (1.50 g) was dissolved in tetrahydrofuran (3.36 g). In the same flask, 5-norbornene-2-carboxylic acid, Catalog No. 147230 from Aldrich Co. (1.32 g), and 2,2'-azobis(2-methylpropionitrile), Catalog No. 441090 from Aldrich Co. (0.014 g), were added. The flask was heated while stirring in a 65° C. oil bath for 24 hours. The product, 6-(2-naphthylthio)bicyclo[2.2.1]heptane-2-carboxylic acid (2.82 g) was isolated by removing tetrahydrofuran by rotary evaporation.

Preparative Example 6

In a 20-mL glass vial equipped with a stir bar, zirconium n-propoxide, 70 wt % solution in n-propanol, Catalog No. AKZ975 from Gelest, Inc. (2.15 g), was added. While stirring, the solution was cooled in an ice bath to 5° C. and a rubber septum was placed on top of the vial. A mixture of 6-(2-naphthylthio)bicyclo[2.2.1]heptane-2-carboxylic acid, as prepared in Preparative Example 5 (1.41 g), and acrylic acid, Catalog No.147230 from Aldrich Co. (0.99 g), was added dropwise to the vial by syringe over a period of 15 minutes. The solution was stirred at room temperature for 12 hours then rotovapped with 2-butanone (2.5 mL) at 40° C. for 30 minutes to a 79 wt % solution.

Example 6

A 2-butanone solution of zirconium 6-(2-naphthylthio)bicyclo[2.2.1]heptane-2-carboxylate triacrylate as prepared in Preparative Example 6 (0.50 g) was added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 100 weight % zirconium 6-(2-naphthylthio)bicyclo[2.2.1]heptane-2-carboxylate triacrylate formed a homogeneous solution, which was stable for at least 3 months upon storage at room temperature. The coating of 100 weight % zirconium 6-(2-naphthylthio)bicyclo[2.2.1]heptane-2-carboxylate triacrylate improved refractive index and slightly decreased scratch resistance and pencil hardness compared to Comparative Example 1 (see Table 1).

Example 7

A 2-butanone solution of zirconium 6-(2-naphthylthio)bicyclo[2.2.1]heptane-2-carboxylate triacrylate as prepared in Preparative Example 6 (0.39 g) and a 2-butanone solution of urethane acrylate as prepared in Preparative Example 1 (0.28 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium 6-(2-naphthylthio)bicyclo[2.2.1]heptane-2-carboxylate triacrylate formed a homogeneous solution, which was stable for at least 3 months upon storage at room temperature. The coating of 50 weight % zirconium 6-(2-naphthylthio)bicyclo[2.2.1]heptane-2-carboxylate triacrylate improved refractive index and slightly decreased scratch resistance compared to Comparative Example 1 (see Table 1). Addition of 50 weight % of PU improved scratch resistance compared to formulation of Example 6, while the refractive index was still higher than Comparative Example 1.

Preparative Example 7

In a 100-mL one-neck round bottom flask equipped with a stir bar, zirconium n-butoxide 80 wt % solution in n-butanol, Catalog No. AKZ945 from Gelest, Inc. (29.12 g), was added. While stirring, the solution was cooled in an ice bath to 5° C. and a rubber septum was placed on top of the vial. Acrylic acid, Catalog No. 147230 from Aldrich Co. (17.82 g) was added dropwise to the vial by syringe over a period of 15 minutes. The solution was stirred at room temperature for 12 hours then rotovapped with 2-butanone (75 mL) at 40° C. for 30 minutes to a 55 wt % solution.

Example 8

A 2-butanone solution of zirconium 6-(2-naphthylthio)bicyclo[2.2.1]heptane-2-carboxylate triacrylate as prepared in Preparative Example 6 (0.13 g) and a 2-butanone solution of urethane acrylate as prepared in Preparative Example 1 (0.27 g) were added to a 1-dram amber vial containing zirconium acrylate (as prepared in Preparative Example 7, 0.18 g), 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 25 weight % zirconium 6-(2-naphthylthio) bicyclo[2.2.1]heptane-2-carboxylate triacrylate with 25 weight % zirconium acrylate formed a homogeneous solution, which was stable for at least 3 months upon storage at room temperature. The coating of 25 weight % zirconium 6-(2-naphthylthio)bicyclo[2.2.1]heptane-2-carboxylate triacrylate with 25 weight % zirconium acrylate improved scratch resistance with only a small decrease in refractive index compared to Example 7 (see Table 1).

Preparative Example 8

In a 40-mL amber vial, dipentaerythritol penta-/hexa-acrylate, Catalog No. 407283 from Aldrich Chemical Company (3.56 g) was dissolved in 2-butanone (3.57 g). The resulting mixture was homogeneous and clear after 20 minutes of rolling on a two mill roller at maximum speed.

Comparative Example 2

A 2-butanone solution of dipentaerythritol penta-/hexa-acrylate as prepared in Preparative Example 8 (0.80 g) was added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after stirring. For sample preparation, coating, curing and testing conditions see Comparative Example 1. The solution is stable for more than 6 months.

Example 9

A 2-butanone solution of zirconium 6-(2-naphthylthio)bicyclo[2.2.1]heptane-2-carboxylate triacrylate as prepared in Preparative Example 6 (0.39 g) and a 2-butanone solution of dipentaerythritol penta-/hexa-acrylate as prepared in Preparative Example 8 (0.40 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium 6-(2-naphthylthio)bicyclo[2.2.1]heptane-2-carboxylate triacrylate formed a homogeneous solution, which was stable for at least 3 months upon storage at room temperature. The coating of 50 weight % zirconium 6-(2-naphthylthio)bicyclo[2.2.1]heptane-2-carboxylate triacrylate improved refractive index compared to Comparative Example 2 (see Table 1).

Preparative Example 9

In a 20-mL glass vial equipped with a stir bar, zirconium n-propoxide, 70 wt % solution in n-propanol, Catalog No. AKZ975 from Gelest, Inc. (2.20 g), was added. While stirring, the solution was cooled in an ice bath to 5° C. and a rubber septum was placed on top of the vial. A mixture of 6-(2-naphthylthio)bicyclo[2.2.1]heptane-2-carboxylic acid, as prepared in Preparative Example 5 (1.41 g), and acrylic acid, Catalog No. 147230 from Aldrich Co. (0.68 g) was added dropwise to the vial by syringe over a period of 15 minutes. After stirring the solution for 12 hours, 2-naphthalenethiol, Catalog No. 270849 from Aldrich Co. (0.75 g), was added to the vial and tetrahydrofuran (1.14 g). The solution was stirred at room temperature for 48 hours then rotovapped with 2-butanone (2.5 mL total) at 40° C. for 30 minutes to a 68 wt % solution.

Example 10

A 2-butanone solution of zirconium 6-(2-naphthylthio)bicyclo[2.2.1]heptane-2-carboxylate 2-naphthalenethiolate diacrylate as prepared in Preparative Example 9 (0.15 g) and a 2-butanone solution of urethane acrylate as prepared in Preparative Example 1 (0.40 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 25 weight % zirconium 6-(2-naphthylthio)bicyclo[2.2.1]heptane-2-carboxylate 2-naphthalenethiolate diacrylate formed a homogeneous solution, which was stable for at least 3 months upon storage at room temperature. The coating of 25 weight % zirconium 6-(2-naphthylthio)bicyclo[2.2.1]heptane-2-carboxylate 2-naphthalenethiolate diacrylate improved refractive index compared to Comparative Example 1 (see Table 1).

Preparative Example 10

In a 50-mL one neck round bottom flask, sodium hydroxide, Catalog No. 655104 from Aldrich Co. (0.33 g) was dissolved in water (37 mL). In the same flask, cis-endo-5-norbornene-2,3-dicarboxylic anhydride, Catalog No. 247634 from Aldrich Co. (2.54 g), and tetrahydrofuran (5 mL) were added. The flask was heated while stirring in a 45° C. water bath for five minutes to dissolve then cooled in an ice bath to 5° C. Bromine, Catalog No. 207888 from Aldrich Co. (2.55 g) was added dropwise to the flask. After stirring for 14 hours at room temperature, extract the product in ethyl acetate (100 mL) and dry with magnesium sulfate. The product, 2-bromo-5-oxo-4-oxatricyclo[4.2.1.0$^{3,7}$]nonane-9-carboxylic acid (3.86 g) was isolated by removing ethyl acetate by rotary evaporation.

In a 20-mL glass vial equipped with a stir bar, zirconium propoxide, 70 wt % solution in n-propanol, Catalog No. AKZ975 from Gelest, Inc. (1.79 g), was added. While stirring, the solution was cooled in an ice bath to 5° C. and a rubber septum was placed on top of the vial. A mixture of 2-bromo-5-oxo-4-oxatricyclo[4.2.1.0$^{3,7}$]nonane-9-carboxylic acid (1.02 g) and acrylic acid, Catalog No. 147230 from Aldrich Co. (0.27 g) dissolved in tetrahydrofuran (1.5 g) was added dropwise to the vial by syringe over a period of 15 minutes. The solution was stirred at room temperature for 12 hours then rotovapped with 2-butanone (2.5 mL total) at 40° C. for 30 minutes to a 50 wt % solution.

Example 11

A 2-butanone solution of zirconium 2-bromo-5-oxo-4-oxatricyclo[4.2.1.0$^{3,7}$]nonane-9-carboxylate triacrylate as prepared in Preparative Example 10 (0.41 g) and a 2-butanone solution of urethane acrylate as prepared in Preparative Example 1 (0.32 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium 2-bromo-5-oxo-4-oxatricyclo[4.2.1.0$^{3,7}$]nonane-9-carboxylate triacrylate formed a homogeneous solution, which was stable for at least 3 months upon storage at room temperature. The coating of 50 weight % zirconium 2-bromo-5-oxo-4-oxatricyclo[4.2.1.0$^{3,7}$]nonane-9-carboxylate triacrylate has improved refractive index but resulted in less favorable scratch resistance than Comparative Example 1 (see Table 1).

Preparative Example 11

In a 50-mL one neck round bottom flask, ascorbic acid, Catalog No. A92902 from Aldrich Co. (4.80 g) was dissolved in acetone (16.42 g). In the same flask, cis-endo-5-norbornene-2,3-dicarboxylic anhydride, Catalog No. 247634 from Aldrich Co. (4.42 g), and 4-dimethylaminopyridine, Catalog No. 522821 from Aldrich Co. (0.06 g), were added. The flask was heated while stirring in a 60° C. oil bath for 48 hours. Water (15 mL) was added and the flask was heated for another 12 hours. The product was extracted in ethyl acetate (100 mL) and dry with magnesium sulfate. The product, a mixture of bicyclo[2.2.1]hept-5-ene-2,3-dicarboxylic acid and 3-({(2S)-2-[(2R)-3,4-dihydroxy-5-oxo-2,5-dihydrofuran-2-yl]-2-hydroxyethoxy}carbonyl)bicyclo[2.2.1]hept-5-ene-2-carboxylic acid was isolated by removing ethyl acetate by rotary evaporation.

In a 20-mL glass vial equipped with a stir bar, zirconium propoxide, 70 wt % solution in n-propanol, Catalog No. AKZ975 from Gelest, Inc. (5.62 g), was added. While stirring, the solution was cooled in an ice bath to 5° C. and a rubber septum was placed on top of the vial. Product mixture (12.54 g) Acrylic acid, Catalog No. 147230 from Aldrich Co. (2.60 g) dissolved in tetrahydrofuran (4.3 g) was added dropwise to the vial by syringe over a period of 15 minutes. The solution was stirred at room temperature for 12 hours then rotovapped with 2-butanone (25 mL total) at 40° C. for 30 minutes to a 34 wt % solution.

Example 12

A 2-butanone solution as prepared in Preparative Example 11 (0.60 g) and a 2-butanone solution of urethane acrylate as prepared in Preparative Example 1 (0.27 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium 3-({(2S)-2-[(2R)-3,4-dihydroxy-5-oxo-2,5-dihydrofuran-2-yl]-2-hydroxyethoxy}carbonyl)bicyclo[2.2.1]hept-5-ene-2-carboxylate/bicyclo[2.2.1]hept-5-ene-2,3-dicarboxylate triacrylate formed a homogeneous solution, which was stable for at least 2 months upon storage at room temperature. The coating of 50 weight % zirconium 3-({(2S)-2-[(2R)-3,4-dihydroxy-5-oxo-2,5-dihydrofuran-2-yl]-2-hydroxyethoxy}carbonyl)bicyclo[2.2.1]hept-5-ene-2-carboxylate/bicyclo[2.2.1]hept-5-ene-2,3-dicarboxylate triacrylate improved refractive index and slightly decreased scratch resistance and pencil hardness compared to Comparative Example 1 (see Table 1).

Preparative Example 12

In a 20-mL glass vial equipped with a stir bar, zirconium n-propoxide 70 wt % solution in n-propanol, Catalog No. AKZ975 from Gelest, Inc. (2.56 g), was added. While stirring, the solution was cooled in an ice bath to 5° C. and a rubber septum was placed on top of the vial. 1-Adamantanecarboxylic acid, Catalog No.106399 from Aldrich Co. (1.42 g) and acrylic acid, Catalog No.147230 from Aldrich Co. (1.72 g), were dissolved in tetrahydrofuran (2.07 g) and added dropwise to the vial by syringe over a period of 15 minutes. The solution was stirred at room temperature for 12 hours then rotovapped with 2-butanone (2.5 mL) at 40° C. for 30 minutes to a 60 wt % solution.

Example 13

A 2-butanone solution of zirconium 1-adamantanecarboxylate triacrylate as prepared in Preparative Example 12 (0.33 g) and a 2-butanone solution of urethane acrylate as prepared in Preparative Example 1 (0.27 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % zirconium 1-adamantanecarboxylate triacrylate formed a homogeneous solution, which was stable for at least 2 months upon storage at room temperature. The coating of 50 weight % zirconium 1-adamantanecarboxylate triacrylate improved refractive index and slightly decreased scratch resistance compared to Comparative Example 1 (see Table 1).

Preparative Example 13

In a 20-mL glass vial equipped with a stir bar, hafnium n-butoxide, Catalog No. AKH325 from Gelest, Inc. (4.25 g), was added. While stirring, the solution was cooled in an ice bath to 5° C. and a rubber septum was placed on top of the vial. In a separate vial (±)-Camphor-10-sulfonic acid, Catalog No. 147923 from Aldrich Co. (2.10 g) and Acrylic acid, Catalog No. 147230 from Aldrich Co. (1.94 g), were dissolved in tetrahydrofuran (3.88 g). The solution was added dropwise to the vial by syringe over a period of 10 minutes. The solution was stirred at room temperature for 12 hours then rotovapped with 2-butanone (15 mL) at 40° C. for 30 minutes to a 50 wt % solution.

Example 14

A 2-butanone solution of hafnium [(1S,4R)-7,7-dimethyl-2-oxobicyclo[2.2.1]hept-1-yl]methanesulfonate triacrylate as prepared in Preparative Example 13 (0.32 g) and a 2-butanone solution of urethane acrylate as prepared in Preparative Example 1 (0.33 g) were added to a 1-dram amber vial containing 1-hydroxy-cyclohexyl-phenyl-ketone, irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 40 weight % hafnium [(1S,4R)-7,7-dimethyl-2-oxobicyclo[2.2.1]hept-1-yl]methanesulfonate triacrylate formed a homogeneous solution, which was stable for at least 3 months upon storage at room temperature. The coating of 40 weight % hafnium [(1S,4R)-7,7-dimethyl-2-oxobicyclo[2.2.1]hept-1-yl]methanesulfonate triacrylate has improved refractive index but has resulted in less favorable scratch resistance compared to Comparative Example 1 (see Table 1).

Preparative Example 14

In a 20-mL glass vial equipped with a stir bar, zirconium n-butoxide 80 wt % solution in n-butanol, Catalog No. AKZ945 from Gelest, Inc. (5.00 g), was added. In a separate vial (±)-Camphor-10-sulfonic acid, Catalog No. 147923 from Aldrich Co. (2.42 g) and Acrylic acid, Catalog No. 147230 from Aldrich Co. (2.25 g), were dissolved in tetrahydrofuran (3.53 g). The solution was added dropwise to the vial by syringe over a period of 10 minutes. The solution was stirred at room temperature for 12 hours then rotovapped with 2-butanone (15 mL) at 40° C. for 30 minutes to a 51 wt % solution.

Example 15

A 2-butanone solution of zirconium [(1S,4R)-7,7-dimethyl-2-oxobicyclo[2.2.1]hept-1-yl]methanesulfonate triacrylate as prepared in Preparative Example 14 (0.32 g) and a 2-butanone solution of urethane acrylate as prepared in Preparative Example 1 (0.33 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 40 weight % zirconium [(1S,4R)-7,7-dimethyl-2-oxobicyclo[2.2.1]hept-1-yl]methanesulfonate triacrylate formed a homogeneous solution, which was stable for at least 3 months upon storage at room temperature. The coating of 40 weight % zirconium [(1S,4R)-7,7-dimethyl-2-oxobicyclo[2.2.1]hept-1-yl]methanesulfonate triacrylate cured, but has decreased scratch resistance compared to Comparative Example 1 (see Table 1).

Example 16

A 2-butanone solution of hafnium [(1S,4R)-7,7-dimethyl-2-oxobicyclo[2.2.1]hept-1-yl]methanesulfonate triacrylate as prepared in Preparative Example 13 (0.15 g) and a 2-butanone solution of urethane acrylate as prepared in Preparative Example 1 (0.32 g) were added to a 1-dram amber vial containing zirconyl dimethacrylate, Catalog No. CXZR051 from Gelest, Inc. (0.08 g), 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 20 weight % hafnium [(1S,4R)-7,7-dimethyl-2-oxobicyclo[2.2.1]hept-1-yl]methanesulfonate triacrylate with 20 weight % zirconyl dimethacrylate formed a homogeneous solution, which was stable for at least 3 months upon storage at room temperature. The coating of 20 weight % hafnium [(1S,4R)-7,7-dimethyl-2-oxobicyclo[2.2.1]hept-1-yl]methanesulfonate triacrylate with 20 weight % zirconyl dimethacrylate did not improve scratch resistance compared to Comparative Example 1 (see Table 1).

Example 17

A 2-butanone solution of zirconium [(1S,4R)-7,7-dimethyl-2-oxobicyclo[2.2.1]hept-1-yl]methanesulfonate triacrylate as prepared in Preparative Example 14 (0.18 g) and a 2-butanone solution of urethane acrylate as prepared in Preparative Example 1 (0.42 g) were added to a 1-dram amber vial containing zirconyl dimethacrylate, Catalog No. CXZR051 from Gelest, Inc. (0.11 g), 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 20 weight % zirconium [(1S,4R)-7,7-dimethyl-2-oxobicyclo[2.2.1]hept-1-yl]methanesulfonate triacrylate with 20 weight % zirconyl dimethacrylate formed a homogeneous solution, which was stable for at least 3 months upon storage at room temperature. The coating of 20 weight % zirconium [(1S,4R)-7,7-dimethyl-2-oxobicyclo[2.2.1]hept-1-yl]methanesulfonate triacrylate with 20 weight % zirconyl dimethacrylate has improved refractive index and poorer scratch resistance compared to Comparative Example 1 (see Table 1).

Example 18

A 2-butanone solution of zirconium 6-(2-naphthylthio)bicyclo[2.2.1]heptane-2-carboxylate triacrylate as prepared in Preparative Example 6 (0.08 g) and a 2-butanone solution of urethane acrylate as prepared in Preparative Example 1 (0.30 g) were added to a 1-dram amber vial containing zirconium acrylate (as prepared in Preparative Example 7, 0.22 g), zirconium [(1S,4R)-7,7-dimethyl-2-oxobicyclo[2.2.1]hept-1-yl]methanesulfonate triacrylate (as prepared in Preparative Example 14, 0.10 g), 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 10 weight % zirconium 6-(2-naphthylthio)bicyclo[2.2.1]heptane-2-carboxylate triacrylate with 30 weight % zirconium acrylate and 10 weight % zirconium [(1S,4R)-7,7-dimethyl-2-oxobicyclo[2.2.1]hept-1-yl]methanesulfonate triacrylate formed a homogeneous solution, which was stable for at least 3 months upon storage at room temperature. The coating of 10 weight % zirconium 6-(2-naphthylthio)bicyclo[2.2.1]heptane-2-carboxylate triacrylate with 30 weight % zirconium acrylate and 10 weight % zirconium [(1S,4R)-7,7-dimethyl-2-oxobicyclo[2.2.1]hept-1-yl]methanesulfonate triacrylate improved refractive index compared to Comparative Example 1 (see Table 1). Addition of a metal acrylate such as zirconium acrylate showed scratch resistance and pencil hardness equivalent to Comparative Example 1.

Preparative Example 15

In a 20-mL glass vial equipped with a stir bar, tetra-n-butoxygermane, Catalog No. GET7060 from Gelest, Inc. (2.48 g), was added to tetrahydrofuran (1.96 g). While stirring, the solution was cooled in an ice bath to 5° C. and a rubber septum was placed on top of the vial. A mixture of 6-(2-naphthylthio)bicyclo[2.2.1]heptane-2-carboxylic acid, as prepared in Preparative Example 5 (2.03 g), and acrylic acid, Catalog No.147230 from Aldrich Co. (1.47 g), was added dropwise to the vial by syringe over a period of 15 minutes. The solution was stirred at room temperature for 12 hours then rotovapped with 2-butanone (5 mL) at 40° C. for 30 minutes to a 59 wt % solution.

Example 19

A 2-butanone solution of germanium 6-(2-naphthylthio)bicyclo[2.2.1]heptane-2-carboxylate triacrylate as prepared in Preparative Example 15 (0.34 g) and a 2-butanone solution of urethane acrylate as prepared in Preparative Example 1 (0.28 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1. In this example, 50 weight % germanium 6-(2-naphthylthio)bicyclo[2.2.1]heptane-2-carboxylate triacrylate formed a homogeneous solution, which was stable for at least 3 months upon storage at room temperature. The coating of 50 weight % germanium 6-(2-naphthylthio)bicyclo[2.2.1]heptane-2-carboxylate triacrylate improved refractive index and decreased scratch resistance compared to Comparative Example 1 (see Table 1).

Preparative Example 16

In a 20-mL glass vial equipped with a stir bar, titanium n-propoxide, Catalog No. AKT885 from Gelest, Inc. (2.02 g), was added to tetrahydrofuran (2.27 g). While stirring, the solution was cooled in an ice bath to 5° C. and a rubber septum was placed on top of the vial. A mixture of 6-(2-naphthylthio) bicyclo[2.2.1]heptane-2-carboxylic acid, as prepared in Preparative Example 5 (2.12 g), and acrylic acid, Catalog No. 147230 from Aldrich Co. (1.53 g), was added dropwise to the vial by syringe over a period of 15 minutes. The solution was stirred at room temperature for 12 hours then rotovapped with 2-butanone (5 mL) at 40° C. for 30 minutes to a 65 wt % solution.

Example 20

A 2-butanone solution of titanium 6-(2-naphthylthio)bicyclo[2.2.1]heptane-2-carboxylate triacrylate as prepared in Preparative Example 16 (0.31 g) and a 2-butanone solution of urethane acrylate as prepared in Preparative Example 1 (0.28 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % titanium 6-(2-naphthylthio) bicyclo[2.2.1]heptane-2-carboxylate triacrylate formed a homogeneous solution, which was stable for at least 3 months upon storage at room temperature. The coating of 50 weight % titanium 6-(2-naphthylthio)bicyclo[2.2.1]heptane-2-carboxylate triacrylate improved refractive index compared to Comparative Example 1 (see Table 1).

Preparative Example 17

In a 20-mL glass vial equipped with a stir bar, niobium n-butoxide, Catalog No. AKN588 from Gelest, Inc. (3.15 g), was added to tetrahydrofuran (2.08 g). While stirring, the solution was cooled in an ice bath to 5° C. and a rubber septum was placed on top of the vial. A mixture of 6-(2-naphthylthio) bicyclo[2.2.1]heptane-2-carboxylic acid, as prepared in Preparative Example 5 (2.05 g), and acrylic acid, Catalog No. 147230 from Aldrich Co. (1.98 g), was added dropwise to the vial by syringe over a period of 15 minutes. The solution was stirred at room temperature for 12 hours then rotovapped with 2-butanone (5 mL) at 40° C. for 30 minutes to a 67 wt % solution.

Example 21

A 2-butanone solution of niobium 6-(2-naphthylthio)bicyclo[2.2.1]heptane-2-carboxylate tetracrylate as prepared in Preparative Example 17 (0.30 g) and a 2-butanone solution of urethane acrylate as prepared in Preparative Example 1 (0.28 g) were added to a 1-dram amber vial containing 1-hydroxy-cyclohexyl-phenyl-ketone, Irgacure 184 from Ciba Specialty Chemicals (0.02 g) and bis(2,4,6-trimethylbenzoyl)-phenylphosphineoxide, Irgacure 819 from Ciba Specialty Chemicals (0.005 g). Additional 2-butanone was added to adjust the concentration to 40% solids. The resulting mixture was homogeneous after shaking to mix. For sample preparation, coating, curing and testing conditions see Comparative Example 1.

In this example, 50 weight % niobium 6-(2-naphthylthio) bicyclo[2.2.1]heptane-2-carboxylate triacrylate formed a homogeneous solution, which was stable for at least 3 months upon storage at room temperature. The coating of 50 weight % niobium 6-(2-naphthylthio)bicyclo[2.2.1]heptane-2-carboxylate triacrylate improved refractive index and decreased scratch resistance compared to Comparative Example 1 (see Table 1).

TABLE 1

| Example No. | Cured | Scratch | PH  | n      |
|-------------|-------|---------|-----|--------|
| CE 1        | yes   | 3+      | 4H  | 1.5200 |
| E 1         | yes   | 3       | 3H  | 1.5230 |
| E 2         | yes   | 3       | 4H  | 1.5315 |
| E 3         | yes   | 1       | HB  | 1.5749 |
| E 4         | yes   | 1       | H   | 1.5606 |
| E 5         | yes   | 2       | 2H  | 1.5474 |
| E 6         | yes   | 2       | 2H  | 1.6424 |
| E 7         | yes   | 2       | 4H  | 1.5740 |
| E 8         | yes   | 3       | 4H  | 1.5590 |
| CE 2        | yes   | 2       | 3H  | 1.5245 |
| E 9         | yes   | 2       | 2H  | 1.5773 |
| E 10        | yes   | 3       | 4H  | 1.5805 |
| E 11        | yes   | 2       | HB  | 1.5432 |
| E 12        | yes   | 2       | 2H  | 1.5515 |
| E 13        | yes   | 2       | 3H  | 1.5336 |
| E 14        | yes   | 1       | 4H  | 1.5306 |
| E 15        | yes   | 2       | 3H  | 1.5302 |
| E 16        | yes   | 2       | 2H  | 1.5356 |
| E 17        | yes   | 2       | 4H  | 1.5381 |
| E 18        | yes   | 3       | 4H  | 1.5512 |
| E 19        | yes   | 1       | H   | 1.5597 |
| E 20        | yes   | 3       | 2H  | 1.5686 |
| E 21        | yes   | 2       | HB  | 1.5751 |

What is claimed is:

1. A composition formed by combining compounds comprising:
   a. a metal-containing precursor unit MU comprising at least one member selected from the group consisting of $$MA_WB_XC_Y \qquad \text{Structure I}$$

where M comprises a metal with formal valency of 0-5 selected from Zr, Hf, Ge, Ti, Sn, Zn, Ni, Nb, Eu, In, Al, Mn, Nd, Sb, Mg, or Y; Ligand A is selected individually or in combination from organic compounds with refractive index of at least 1.5; w is 1 to 5; Ligand B contains an ethylenically unsaturated functional group capable of undergoing a combining reaction; x is 0 to 4, with the proviso that x is 0 only when A contains an ethylenically unsaturated functional group capable of undergoing a combining reaction; Ligand C is selected from oxygen, sulfur, a halogen atom, or —$XR^1$ where X is oxygen or sulfur and $R^1$ represents an alkyl group, an alkyl ether group, a group containing a halogen atom, or a substituted or unsubstituted aryl group; y is 0 to 4; and the sum of w, x, and y equals 2 to 5 wherein at least a portion of the metal-containing precursor unit contains at least two ethylenically unsaturated functional groups with the proviso that when the sum of w, x, and y equals 2 both ligands contain ethylenically unsaturated functional groups and at least one liqand has a refractive index of at least 1.5 (w=1 or 2,x=0 or 1 and y =0), and b. a catalyst or an initiator capable of inducing a combining reaction of ethylenically unsaturated functional groups of the metal-containing precursor units, wherein the composition is optically clear as measured by the Transmittance Test.

2. The composition of claim 1, having index of refraction in the range of 1.5 to 1.8 in the 400-700 nm range of light and 1.5 to 2.4 in the 150-400 nm range of light.

3. The composition of claim 1,having transmittance of at least 95% as measured by the Transmittance Test.

4. The composition of claim 1, wherein a cured film or article formed from the composition has at least 90% retention of optical clarity.

5. The composition of claim 1, wherein Ligand A of the metal-containing precursor unit comprises at least one member selected from the group consisting of (5R)-5-[(1S)-1,2-dihydroxyethyl]-3-hydroxy-4-oxo-4,5-dihydrofuran-2-olate, 2-naphthalenethiolate, (9H-xanthen-9-ylthio)acetate, 3-({(2S)-2-[(2R)-3,4-dihydroxy-5-oxo-2,5-dihydrofuran-2-yl]-2-hydroxyethoxy}carbonyl) bicyclo[2.2.1 ]hept-5-ene-2-carboxylate, adamantane-1,3,5-tricarboxylate, 6-[(2-carboxyethyl)thio]-3-({(2S)-2-[(2R)-3,4-dihydroxy-5-oxo-2,5-dihydrofuran-2-yl]-2-hydroxyethoxy}carbonyl)-bicyclo[2.2.1]heptane-2-carboxylate, 4-mercaptotetracyclo[4.4.0.1$^{2,5}$.1$^{7,10}$]dodec-8-ene-3-carboxylate, 3-{[2-(acryloyloxy)ethoxy]carbonyl}-6-(naphthylthio)bicyclo[2.2.1]heptane-2-carboxylate, (5R)-5-[(1S)-2-{[3-(bicyclo[2.2.1 ]hept-5-en-2-ylthio)propanoyl]oxy}-1-hydroxyethyl]-3-hydroxy-4-oxo-4,5-dihydrofuran-2-olate, 4-hydroxytetracyclo-[4.4.0.1$^{2,5}$-1$^{7,10}$]dodec-8-ene-3-carboxylate, 2-hydroxy-5-oxo-4-oxatricyclo[4.2.1.0$^{3,7}$]nonane-9-carboxylate, 2-bromo-5-oxo-4-oxatricyclo[4.2.1.0$^{3,7}$]nonane-9-carboxylate, adamantane-1,3-dicarboxylate, 3-[(3,5-dioxo-4-azatricyclo[5.2.1.0$^{2,6}$]dec-8-yl)thio]propanoate, 3-(tetracyclo[4.4.0.$^{2,5}$.1$^{7,10}$]dodec-8-en-3-ylthio)propanoate, 5-(bicyclo[2.2.1 ]hept-5-en-2-ylthio)bicyclo[2.2.1]heptane-2-carboxylate,(5R)-5-[(1S)-2-(acryloyloxy)-1-hydroxyethyl]-3-hydroxy-4-oxo-4,5-dihydrofuran-2-olate, 5-[(2-carboxyethyl)thio]bicyclo[2.2.1 ]heptane -2,3-dicarboxylate, 5,6-dibromo-2-(2-hydroxyethyl)bicyclo[2.2.1]heptane-2-carboxylate, 3-[(4-hydroxypiperidin-1 -yl)carbonyl]bicyclo[2.2.1 ]hept-5-ene-2-carboxylate, 9-hydroxytetracyclo[4.4.0.1$^{2,5}$.1$^{7,10}$]dodecane-3-carboxylate, bromobenzoate, 3-mercaptobicyclo[2.2.1 ]hept-5-ene-2-carboxylate, 3-[(3,5-dioxo-4-oxatricyclo[5.2.1.0.$^{2,6}$]dec-8-yl)thio]propanoate, 3-({4-[2-(acryloyloxy)ethyl]-3,5-dioxo-4-azatricyclo[5.2.1.0$^{2,6}$]dec-8-yl}thio)propanoate, bicyclo[2.2.1]hept-5-ene-2,3-dicarboxylate, 3-(tricyclo[5.2.1.0$^{2,6}$]dec-4-en-8-ylthio)propanoate, 3-{[(hydroxymethyl)amino]carbonyl}bicyclo[2.2.1 ]hept-5-ene-2-carboxylate,3-{9-(acryloyloxy)tetracyclo[4.4.0.1$^{2,5}$.1$^{7,10}$]dodec-3-yl]thio}propanoate, 5-f[2-carboxyethyl)thio]bicyclo[2.2.1 ]heptane-2-carboxylate, 3-[(5'-oxodihydro-3'H-spiro[bicyclo[2.2.1]heptane-2,2'-furan]-6-yl)thiolpropanoate, 5-(acryloyloxy)-6-hydroxybicyclo[2.2.1]heptane-2,3-dicarboxylate, 5-[(1 -carboxyethyl)thio]-bicyclo[2.2.1]heptane-2-carboxylate, 3-(bicyclo[2.2.1 ]hept-5-en-2-ylthio)propanoate, 3-{[(2-hydroxycyclopentyl)oxy]carbonyl}bicyclo[2.2.1]hept-5-ene-2-carboxylate, 3- ({6-[(acryloyloxy)methyl]tetracyclo[4.4.0.1$^{2,5}$ .1$^{7,10}$]dodec3-yl}thio) propanoate, (5R)-5-[(1 S)-2-(butyryloxy)-1 -hydroxyethyl]-3-hydroxy-4-oxo-4,5-dihydrofuran-2-olate, 3-[(6-{[(methylsulfonyl)amino]methyl}bicyclo[2.2.1]hept-2-yl)thiol]propanoate, 2-(acryloyloxy)-5-oxo-4-oxatricyclo[4.2.1.0.$^{3,7}$]nonane-9-carboxylate, 6-[(2-carboxyethyl)thio]-3-(methoxycarbonyl)bicyclo[2.2.1]heptane-2-carboxylate, 5-{[3-(acryloyloxy)propy]thio}bicyclo[2 2.1]heptane-2,3-dicarboxylate, 5-(cyclopentylthio)bicyclo[2.2.1 ]heptane-2-carboxylate, adamantane-1-carboxylate, 3-{[9-(acryloyloxy)tricyclo[5.2.1.0$^{2,6}$]dec-3-yl]thio}propanoate, 3-{[4-(acryloyloxy)tricyclo[5.2.1.0$^{2,6}$]dec-8-yl]thio}propanoate, 3-{[2-(acryloyloxy)ethoxy]carbonyl}-6-[(2-carboxyethyl)thio]bicyclo[2.2.1]heptane-2-carboxylate, 3-({5-[(acryloyloxy)methyl]tricyclo[5.2.1.0$^{2,6}$]dec-8-yl}thio)propanoate, bicyclo[2.2.1 ]hept-5-ene-2-carboxylate, 3-({9-[2-(acryloyloxy)ethoxy]-tricyclo[5.2.1 0$^{2,6}$]dec-3-yl}thio)propanoate, 3-{[6-(acryloyloxy)bicyclo[2 .2.1 ]hept-2-yl]thio}propanoate, 5-(acryloyloxy)-6-hydroxybicyclo[2.2.1]heptane-2-carboxylate, 3-({6-[(acryloyloxy)methyl]bicyclo[2.2.1 ]hept-2-yl}thio)propanoate, 3-[(6-{[2-(acryloyloxy)ethoxy]carbonyl}bicyclo[2.2.1 ]hept-2-yl)thio]propanoate, 2-methylene-4-oxo-4-(tricyclo[5.2.1 .02,6]dec-8-en-3-ylmethoxy)butanoate, 3-{[2-(acryloyloxy) ethoxy]carbonyl}bicyclo[2.2.1]hept-5-ene-2-carboxylate, [(1S ,4R) -7,7-dimethyl-2-oxobicyclo[2.2.1 ]hept-1-yl]methanesulfonate, 4-(bicyclo[2.2.1]hept-5-en-2-ylmethoxy)-2-methylene-4-oxobutanoate, cyclohexane-1,2-dicarboxylate and (5R)-5-[(1S)-2-(hexadecyloxy)-1-hydroxyethyl]-3-hydroxy-4-oxo-4,5-dihydrofuran-2-olate.

6. The composition of claim 1, wherein Ligand B of the metal-containing precursor unit comprises at least one member selected from the group consisting of acrylate, methacrylate, styryl, vinyl, allyl and cyclo-olefin.

7. The composition of claim 1, wherein the metal-containing precursor unit comprises at least one member selected from the group consisting of zirconium 6-(2-naphthylthio) bicyclo[2.2.1]heptane-2-carboxylate triacrylate, hafnium [(1S,4R)-7,7-dimethyl-2-oxobicyclo[2.2.1]hept-1-yl]methanesulfonate triacrylate, zirconium bicyclo[2.2.1 ]hept-5-ene-2-carboxylate, zirconium 6-(2-naphthylthio) bicyclo[2.2.1]heptane-2-carboxylate 2-naphthalenethiolate diacrylate, zirconium di-bicyclo[2.2.1]hept-5-ene-2-carboxylate diacrylate, zirconium bicyclo[2.2.1]hept-5-ene-2-carboxylate triacrylate, 2-bromo-5-oxo-4-oxatricyclo[4.2.1.0$^{3,7}$]nonane-9-carboxylate triacrylate, zirconium 3-({(2S)-2-[(2R)-3,4-dihydroxy-5-oxo-2,5-dihydrofuran-2-yl]-2-hydroxyethoxy}carbonyl) bicyclo[2.2.1]hept-5-ene-2-carboxylate, bicyclo[2.2.1]hept-5-ene-2,3-dicarboxylate triacrylate, 1-adamantanecarboxylate triacrylate and zirconium [(1S ,4R)-7,7-dimethyl-2-oxobicyclo[2.2.1]hept-1-yl] methanesulfonate triacrylate.

8. The composition of claim 1 further comprising a prepolymer unit, PU, containing at least two ethylenically unsaturated functional groups.

9. The composition of claim 8, wherein the prepolymer unit comprises at least one member selected from the group consisting of urethane (meth)acrylate, urethane multi (meth)acrylate, multiurethane (meth)acrylate, multiurethane multi (meth)acrylate, 1,6-hexanediol(meth)acrylate, tetraethyleneglycol di(meth)acrylate, divinylbenzene, ethoxylated bisphenol-A-di(meth)acrylate, diethylene glycol bis(allyl carbonate), trimethylolpropane tri(meth)acrylate, ditrimethyloipropane tetra(meth)acrylate, pentaerythritol tri(meth)acrylate, pentaerythritol tetra(meth)acrylate, dipentaerythritol penta-/hexa-(meth)acrylate, isocyanurate tri (meth)acrylate, bis(2-hydroxyethyl)isocyanurate di(meth) acrylate, 1,3-butanediol tri(meth)acrylate, 1,4-butanediol tri (meth)acrylate, neopentyl glycol di(meth)acrylate, vinyl-containing siloxanes, (meth) acryloyl-containing siloxanes, hydrogen-containing siloxanes, (meth)acrylate modified-urea-formaldehyde, melamine-formaldehyde and cellulose.

10. The composition of claim 8, wherein the composition comprises between about 5-90 weight %, on the basis of total solids, of metal-containing precursor unit MU.

11. The composition of claim 1, further comprising a metal (meth)acrylate wherein the metal has a formal valency of at least 4.

12. The composition of claim 11 wherein the metal (meth) acrylate can be selected individually or in combination from zirconium, hafnium, germanium, niobium or titanium (meth) acrylate.

13. The composition of claim 1, further comprising a co-monomer with only one ethylenically unsaturated functional group.

14. The composition of claim 1, wherein the compounds undergo the combining reaction in the presence of at least one of UV light and heat.

15. A film or article formed from the composition of claim 1.

16. The film or article of claim 15, having at least 90% retention of optical clarity.

17. A composition comprising:
a. a metal-containing precursor unit MU comprising at least one member selected from the group consisting of a unit represented by Structure I $$MA_W B_X C_Y \qquad \text{Structure I}$$

where M comprises a metal with formal valency of 0-5 selected from Zr, Hf, Ge, Ti, Sn, Zn, Ni, Nb, Eu, In, Al, Mn, Nd, Sb, Mg, or Y; Ligand A is selected individually or in combination from organic compounds with refractive index of at least 1.5; w is 1 to 5; Ligand B contains an ethylenically unsaturated functional group capable of undergoing a combining reaction; x is 0 to 4, with the proviso that x is 0 only when A contains ethylenically unsaturated functional group capable of undergoing combining reaction; Ligand C is selected from oxygen, sulfur, a halogen atom, or $XR^1$ where X is oxygen or sulfur and $R^1$ represents an alkyl group, an alkyl ether group, a group containing a halogen atom, or a substituted or unsubstituted aryl group; y is 0 to 4; and the sum of w, x, and y equals 2 to 5, wherein at least a portion of the metal-containing precursor unit contains at least two ethylenically unsaturated functional groups with the proviso that when the sum of w, x, and y equals 2 both ligands contain ethylenically unsaturated functional groups and at least one ligand refractive index is at least 1.5 and b. a catalyst or an initiator capable of inducing a combining reaction of ethylenically unsaturated functional groups of the metal-containing precursor unit, wherein the composition, after reaction, is optically clear as measured by the Transmittance Test.

18. The composition of claim 17 further comprising a prepolymer unit, PU, containing at least two ethylenically unsaturated functional groups.

19. The composition of claim 17, wherein the composition comprises between about 5-90 weight %, on the basis of total solids, of metal-containing precursor unit MU.

20. A method of making an article comprising:
preparing a mixture comprising a metal-containing precursor unit MU and a catalyst or initiator under conditions sufficient to induce a combining reaction of ethylenically unsaturated functional groups of the metal-containing precursor units, the metal-containing precursor unit comprising at least one member selected from the group consisting of
1) a metal-containing unit represented by Structure I $$MA_W B_X C_Y \qquad \text{Structure I}$$

where M comprises a metal with formal valency of 0-5 selected from Zr, Hf, Ge, Ti, Sn, Zn, Ni, Nb, Eu, In, Al, Mn, Nd, Sb, Mg, or Y; Ligand A is selected individually or in combination from organic compounds with refractive index of at least 1.5; w is 1 to 5; Ligand B contains an ethylenically unsaturated functional group capable of undergoing a combining reaction; x is 0 to 4, with the proviso that x is 0 only when A contains ethylenically unsaturated functional group capable of undergoing a combining reaction; Ligand C is selected from oxygen, sulfur, a halogen atom, or $—XR^1$ where X is oxygen or sulfur and $R^1$ represents an alkyl group, an alkyl ether group, a group containing a halogen atom, or a substituted or unsubstituted aryl group; y is 0 to 4; and the sum of w, x, and y equals 2 to 5, wherein at least a portion of the metal-containing precursor unit contains at least two ethylenically unsaturated functional groups with the proviso that when the sum of w, x, and y equals 2 both ligands contain ethylenically unsaturated functional groups and at least one ligand refractive index is at least 1.5, forming the mixture into an article, and
curing the article, the cured article being optically clear as measured by the Transmittance Test.

21. The method of claim 20, wherein the mixture is at least partially cured prior to forming the article.

22. The method of claim 20, wherein the article is a film.

23. The method of claim 20 wherein the mixture further comprises a prepolymer unit, PU, containing at least two ethylenically unsaturated functional groups.

24. The method of claim 23, wherein the mixture comprises between about 5-90 weight %, on the basis of total solids, of metal-containing precursor unit MU.

25. The composition of claim 1, wherein at least a portion of the metal-containing precursor unit contains at least three ethylenically unsaturated functional groups.

26. The composition of claim 17, wherein at least a portion of the metal-containing precursor unit contains at least three ethylenically unsaturated functional groups.

27. The method of claim 20, wherein at least a portion of the metal-containing precursor unit contains at least three ethylenically unsaturated functional groups.

* * * * *

UNITED STATES PATENT AND TRADEMARK OFFICE
CERTIFICATE OF CORRECTION

PATENT NO. : 7,629,424 B2  Page 1 of 1
APPLICATION NO. : 11/792739
DATED : December 8, 2009
INVENTOR(S) : Malik et al.

It is certified that error appears in the above-identified patent and that said Letters Patent is hereby corrected as shown below:

Column 27:
Line 34, delete "[4.4.0.1$^{2,5}$-1$^{7,10}$]" and substitute --[4.4.0.1$^{2,5}$.1$^{7,10}$]--.

Line 39, delete "[4.4.0.$^{2,5}$.1$^{7,10}$]" and substitute --[4.4.0.1$^{2,5}$.1$^{7,10}$]--.

Line 55, delete "late,3-{9-" and substitute --late, 3-{[9- --.

Line 56, delete "5-f[2-" and substitute --5-[(2- --.

Line 58, delete "thiolpropanoate," and substitute --thio]propanoate,--.

Line 64, delete "dodec3-yl]" and substitute --dodec-3-yl]--.

Column 28:
Line 2, delete "[4.2.1.0.$^{3,7}$]" and substitute --[4.2.1.0$^{3,7}$]--.

Line 4, delete "propy]thio}" and substitute --propyl]thio}--.

Line 4, delete "bicyclo[2 2.1]" and substitute --bicyclo[2.2.1]--.

Line 13, delete "[5.2.1 0$^{2,6}$]" and substitute --[5.2.1.0$^{2,6}$]--.

Line 57, delete "1,6-hexanediol(meth)acrylate," and substitute
--[1,6-hexanediol di(meth)acrylate,--.

Line 61, delete "ditrimethyloipropane" and substitute
--ditrimethylolpropane--.

Column 29:
Line 39, delete "or XR$^1$" and substitute --or –XR$^1$--.

Signed and Sealed this

Sixth Day of April, 2010

David J. Kappos
*Director of the United States Patent and Trademark Office*